United States Patent
Sharma et al.

(10) Patent No.: US 12,433,686 B2
(45) Date of Patent: Oct. 7, 2025

(54) SYSTEMS AND METHODS FOR VISUALIZING A TRAJECTORY WITH A SURGICAL INSTRUMENT

(71) Applicant: Stryker Corporation, Kalamazoo, MI (US)

(72) Inventors: Rahul Sharma, Gurgaon (IN); Sanjeev Gautam, Gurgaon (IN)

(73) Assignee: Stryker Corporation, Portage, MI (US)

( * ) Notice: Subject to any disclaimer, the term of this patent is extended or adjusted under 35 U.S.C. 154(b) by 341 days.

(21) Appl. No.: 18/011,382

(22) PCT Filed: Aug. 4, 2021

(86) PCT No.: PCT/US2021/044429
§ 371 (c)(1),
(2) Date: Dec. 19, 2022

(87) PCT Pub. No.: WO2022/031770
PCT Pub. Date: Feb. 10, 2022

(65) Prior Publication Data
US 2023/0233263 A1 Jul. 27, 2023

Related U.S. Application Data

(60) Provisional application No. 63/060,726, filed on Aug. 4, 2020.

(51) Int. Cl.
*A61B 34/20* (2016.01)
*A61B 17/17* (2006.01)
(Continued)

(52) U.S. Cl.
CPC .......... *A61B 34/20* (2016.02); *A61B 17/1728* (2013.01); *A61B 2034/107* (2016.02);
(Continued)

(58) Field of Classification Search
CPC ...... A61B 2034/107; A61B 2034/2048; A61B 2034/2051; A61B 2034/2055;
(Continued)

(56) References Cited

U.S. PATENT DOCUMENTS

| 5,517,990 A | 5/1996 | Kalfas et al. |
| 5,967,982 A | 10/1999 | Barnett |

(Continued)

FOREIGN PATENT DOCUMENTS

| EP | 2781199 B1 | 12/2016 |
| EP | 2677955 B1 | 5/2018 |

(Continued)

OTHER PUBLICATIONS

Gronenschild, Ed, "Correction for Geometric Image Distortion in the X-Ray Imaging Chain: Local Technique Versus Global Technique", Med Phys., vol. 26, No. 12, Dec. 1999, pp. 2602-2616.

(Continued)

*Primary Examiner* — Samuel S Hanna
(74) *Attorney, Agent, or Firm* — Howard & Howard Attorneys PLLC

(57) ABSTRACT

A surgical system for operating on a bone of a patient is described. The surgical system includes a reference device including one or more radiopaque markers, a first sensor configured to generate a first signal pertaining to orientation data of the reference device relative to a first coordinate system, a surgical instrument for coupling to an end effector, a second sensor configured to generate a second signal pertaining to orientation data of at least one of the end effector and the surgical instrument relative to a second coordinate system, and a navigation system. The navigation system is configured to determine an orientation of at least one of the end effector and the surgical instrument and superimpose a virtual representation of at least one of the
(Continued)

end effector and the surgical instrument over the image based on the determined orientation and user input.

16 Claims, 20 Drawing Sheets

(51) Int. Cl.
 *A61B 34/10* (2016.01)
 *A61B 90/00* (2016.01)

(52) U.S. Cl.
 CPC ............... *A61B 2034/2048* (2016.02); *A61B 2034/2065* (2016.02); *A61B 2034/2072* (2016.02); *A61B 2090/364* (2016.02); *A61B 2562/0257* (2013.01)

(58) Field of Classification Search
 CPC .... A61B 2034/2065; A61B 2090/3983; A61B 2562/0257; A61B 90/39; A61B 34/20; A61B 2090/3966
 See application file for complete search history.

(56) References Cited

U.S. PATENT DOCUMENTS

| | | | |
|---|---|---|---|
| 6,021,343 A | 2/2000 | Foley et al. | |
| 6,167,145 A | 12/2000 | Foley et al. | |
| 6,167,296 A | 12/2000 | Shahidi | |
| 6,226,548 B1 | 5/2001 | Foley et al. | |
| 6,314,310 B1 | 11/2001 | Ben-Haim et al. | |
| 6,470,207 B1 | 10/2002 | Simon et al. | |
| 6,474,159 B1 | 11/2002 | Foxlin et al. | |
| 6,491,699 B1 | 12/2002 | Henderson et al. | |
| 6,535,756 B1 | 3/2003 | Simon et al. | |
| 6,920,347 B2 | 7/2005 | Simon et al. | |
| 7,611,522 B2 | 11/2009 | Gorek | |
| 7,660,623 B2 | 2/2010 | Hunter et al. | |
| 7,702,477 B2 | 4/2010 | Tuemmler et al. | |
| 8,057,479 B2 | 11/2011 | Stone | |
| 8,057,482 B2 | 11/2011 | Stone et al. | |
| 8,118,815 B2 | 2/2012 | van der Walt | |
| 8,241,296 B2 | 8/2012 | Wasielewski | |
| 8,400,312 B2 | 3/2013 | Hotokebuchi et al. | |
| 8,442,621 B2 | 5/2013 | Gorek et al. | |
| 8,611,697 B2 | 12/2013 | Nathaniel et al. | |
| 8,814,877 B2 | 8/2014 | Wasielewski | |
| 8,888,786 B2 | 11/2014 | Stone et al. | |
| 8,936,466 B2 | 1/2015 | Moffson et al. | |
| 8,974,467 B2 | 3/2015 | Stone | |
| 9,121,699 B2 | 9/2015 | van der Merwe et al. | |
| 9,144,470 B2 | 9/2015 | Proulx et al. | |
| 9,226,799 B2 | 1/2016 | Lightcap et al. | |
| 9,237,885 B2 | 1/2016 | Stein et al. | |
| 9,351,782 B2 | 5/2016 | Stein et al. | |
| 9,539,060 B2 | 1/2017 | Lightcap et al. | |
| 9,649,160 B2 | 5/2017 | van der Walt et al. | |
| 9,681,925 B2 | 6/2017 | Azar et al. | |
| 9,687,307 B2 | 6/2017 | Wu | |
| 9,706,948 B2 | 7/2017 | Bhandari | |
| 9,801,685 B2 | 10/2017 | Nguyen et al. | |
| 9,931,059 B2 | 4/2018 | Borja | |
| 10,064,569 B2 | 9/2018 | Dalal et al. | |
| 10,080,509 B2 | 9/2018 | Wasielewski | |
| 10,123,840 B2 | 11/2018 | Dorman | |
| 10,172,662 B2 | 1/2019 | Gustafson et al. | |
| 10,179,032 B2 | 1/2019 | Andersson | |
| 10,258,256 B2 | 4/2019 | Mahfouz | |
| 10,463,415 B2 | 11/2019 | Walter et al. | |
| 11,064,904 B2 | 7/2021 | Kay et al. | |
| 11,246,509 B2 | 2/2022 | Bhandari | |
| 2003/0028091 A1 | 2/2003 | Simon et al. | |
| 2008/0039868 A1 | 2/2008 | Tuemmler et al. | |
| 2010/0179418 A1 | 7/2010 | Mueller et al. | |
| 2011/0320153 A1 | 12/2011 | Lightcap et al. | |
| 2013/0261633 A1 | 10/2013 | Thornberry | |
| 2016/0095631 A1 | 4/2016 | Stad | |
| 2016/0137345 A1 | 5/2016 | Grodsky et al. | |
| 2017/0007328 A1 | 1/2017 | Cattin et al. | |
| 2017/0143494 A1 | 5/2017 | Mahfouz | |
| 2017/0245781 A1 | 8/2017 | Kay et al. | |
| 2017/0296203 A1 | 10/2017 | Stone | |
| 2017/0359809 A1 | 12/2017 | Nakao et al. | |
| 2018/0005571 A1 | 1/2018 | Song | |
| 2018/0085135 A1 | 3/2018 | Singh et al. | |
| 2018/0110569 A1 | 4/2018 | Drain | |
| 2018/0140309 A1 | 5/2018 | Fouts et al. | |
| 2018/0193171 A1 | 7/2018 | van der Walt et al. | |
| 2018/0199999 A1 | 7/2018 | Syverson et al. | |
| 2018/0206860 A1 | 7/2018 | van der Walt et al. | |
| 2018/0279913 A1 | 10/2018 | Frasier et al. | |
| 2018/0280037 A1 | 10/2018 | Dassonville et al. | |
| 2018/0296232 A1 | 10/2018 | Nielsen et al. | |
| 2018/0296365 A1 | 10/2018 | Nielsen et al. | |
| 2018/0303559 A1 | 10/2018 | Shepherd et al. | |
| 2019/0000561 A1 | 1/2019 | Decker et al. | |
| 2019/0040810 A1 | 2/2019 | Andersson et al. | |
| 2019/0069907 A1 | 3/2019 | Amiot et al. | |
| 2019/0083178 A1 | 3/2019 | Mata et al. | |
| 2019/0090955 A1 | 3/2019 | Singh et al. | |
| 2019/0133693 A1* | 5/2019 | Mahfouz ................. A61B 6/12 |
| 2019/0183589 A1 | 6/2019 | Cappadona et al. | |
| 2019/0231443 A1 | 8/2019 | McGinley et al. | |
| 2019/0290366 A1 | 9/2019 | Pettersson et al. | |
| 2019/0380789 A1 | 12/2019 | Link et al. | |
| 2020/0221974 A1 | 7/2020 | Singh | |

FOREIGN PATENT DOCUMENTS

| | | |
|---|---|---|
| JP | 2014520637 A | 8/2014 |
| WO | 2015114119 A1 | 8/2015 |
| WO | 2017040783 A1 | 3/2017 |
| WO | 2018085900 A1 | 5/2018 |
| WO | 2018157135 A1 | 8/2018 |
| WO | 2018213489 A1 | 11/2018 |
| WO | 2019035096 A1 | 2/2019 |
| WO | 2019070729 A1 | 4/2019 |
| WO | 2019202320 A1 | 10/2019 |
| WO | 2022125833 A1 | 6/2022 |

OTHER PUBLICATIONS

International Search Report for Application No. PCT/US2021/044429 dated Nov. 11, 2021, 2 pages.
Stryker, "Adapt for Gamma3 Webpage", https://www.stryker.com/us/en/trauma-and-extremities/products/ADAPT-for-Gamma3.html, 2021, 4 pages.
Stryker, "FluoroMap Adaptive Positioning Technology for Gamma3 System User Manual", https://www.strykermeded.com/media/2325/gamma3-adapt-fluoromap.pdf, 2012, 40 pages.
Stryker, "Spine Map Go Products Webpage", https://neurosurgical.stryker.com/products/, 2022, 5 pages.
Zimmer Biomet, "iAssist Knee 2-Pod Version Surgical Technique Brochure", 2018, 68 pages.
English language abstract for JP 2014-520637 A extracted from espacenet.com database on Mar. 24, 2025, 2 pages.

* cited by examiner

SYSTEMS AND METHODS FOR VISUALIZING A TRAJECTORY WITH A SURGICAL INSTRUMENT

CROSS-REFERENCE TO RELATED APPLICATIONS

This application claims the benefit of and priority to U.S. Provisional Patent Application No. 63/060,726, filed Aug. 4, 2020, which is incorporated herein by reference in its entirety.

BACKGROUND

Conventional medical and surgical procedures routinely involve the use of surgical tools and instruments which allow surgeons to approach and manipulate surgical sites. By way of non-limiting example, rotary instruments such as handheld drills are commonly utilized in connection with orthopedic procedures to address various musculoskeletal conditions, such as trauma, sports injuries, degenerative diseases, joint reconstruction, and the like.

In procedures where handheld drills or similar surgical instruments are employed, rotational torque selectively generated by an actuator (e.g., an electric motor) is used to rotate a releasably-attachable end effector, such as a drill bit, or other surgical attachments at different speeds. A surgical handpiece assembly drills bores in the bone against which the end effector is applied.

One type of orthopedic procedure is an open reduction internal fixation (ORIF) procedure. During an ORIF procedure, a surgeon realigns a broken bone and fixates the bone in place with one or more surgical implants. The one or more surgical implants may include a bone plate and screws. The screws hold the bone plate in the proper position relative to the bone. After a period of time elapses, the bone plate and screws may be removed when it is determined that the bone is healed.

SUMMARY

A surgical system for operating on a bone of a patient is disclosed. The surgical system includes a reference device defining at least one reference axis and including one or more radiopaque markers. The reference device is configured to have a fixed pose relative to a surgical implant. The surgical system also includes a first sensor that is configured to have a fixed pose relative to the reference device when disposed on the reference device and configured to generate a first signal pertaining to orientation data of the reference device relative to a first coordinate system. The surgical system also includes a surgical instrument for coupling to an end effector. The surgical system also includes a second sensor that is configured to have a fixed pose relative to the surgical instrument and that is configured to generate a second signal pertaining to orientation data of at least one of end effector and the surgical instrument relative to a second coordinate system. The surgical system also includes a navigation system that is configured to receive (i) the first signal, (ii) the second signal, and (iii) an image of the reference device and the bone of the patient; display the image of the reference device and the bone of the patient. The navigation system is further configured to receive at least one user input related to a desired position of at least one of the end effector and the surgical instrument relative to the bone. The navigation system is further configured to register (i) the first coordinate system to the second coordinate system when an axis of at least one of the surgical instrument and the end effector is aligned with the at least one reference axis, (ii) an orientation of the at least one reference axis relative to the bone in an image coordinate system, and (iii) at least one position of at least one of the end effector and the surgical instrument relative to the bone based on the user input. The navigation system is further configured to determine an orientation of at least one of the end effector and the surgical instrument relative to bone based on the first signal and the second signal. The navigation system is further configured to superimpose a virtual representation of at least one of the end effector and the surgical instrument over the image based on the registered position and the determined orientation of at least one of the end effector and the surgical instrument.

A method for operating on a bone of a patient with a surgical system is disclosed. The surgical system including a navigation system, a surgical instrument, a reference device defining at least one reference axis and including one or more radiopaque markers, a first sensor having a first coordinate system and having a fixed pose relative to the reference device, the reference device configured to have a fixed pose relative to a surgical implant. The surgical instrument includes a second sensor having a second coordinate system and having a fixed pose relative to the surgical instrument. The surgical instrument is configured to be coupled to an end effector, The method includes receiving (i) a first signal pertaining to orientation data of the reference device from the first sensor, (ii) a second signal pertaining to orientation data of at least one of the end effector and the surgical instrument from the second sensor, and (iii) an image of the reference device and the bone of the patient. The method further includes displaying the image of the reference device and the bone of the patient. The method further includes receiving user input on the display related to a desired position of at least one of the end effector and the surgical instrument relative to the bone. The method further includes registering (i) the first coordinate system to the second coordinate system when an axis of at least one of the surgical instrument and the end effector is aligned with the at least one reference axis, and (iii) a position of at least one of the end effector and the surgical instrument relative to the bone based on the user input. The method further includes determining an orientation of at least one of the end effector and the surgical instrument relative to the bone based on the first signal and the second signal. The method further includes superimposing a virtual representation of at least one of the end effector and the surgical instrument over the image based on the registered position and determined orientation of at least one of the end effector and the surgical instrument.

A surgical system for operating on a bone of a patient. The surgical system includes a reference device defining at least one reference axis and including one or more radiopaque markers. The reference device is configured to be disposed on the patient. The surgical system further includes a surgical instrument, including a sensor, for coupling to an end effector, the sensor being configured to generate a first signal pertaining to orientation data of the surgical instrument relative to a first coordinate system. The surgical system further includes a surgical navigation system configured to receive an image of the reference device and of the bone of the patient. The surgical navigation system is further configured to display the image of the reference device and of the bone of the patient. The surgical navigation system is further configured to register (i) an orientation of the at least one reference axis relative to the bone in an image coordinate system and (ii) the first coordinate system to the image coordinate system. The surgical navigation system is further configured to determine an orientation of the surgical instrument relative to the bone based on the first signal. The surgical navigation system is further configured to superimpose a virtual representation of the surgical instrument relative to the bone based on the determined orientation and a position of the surgical instrument.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
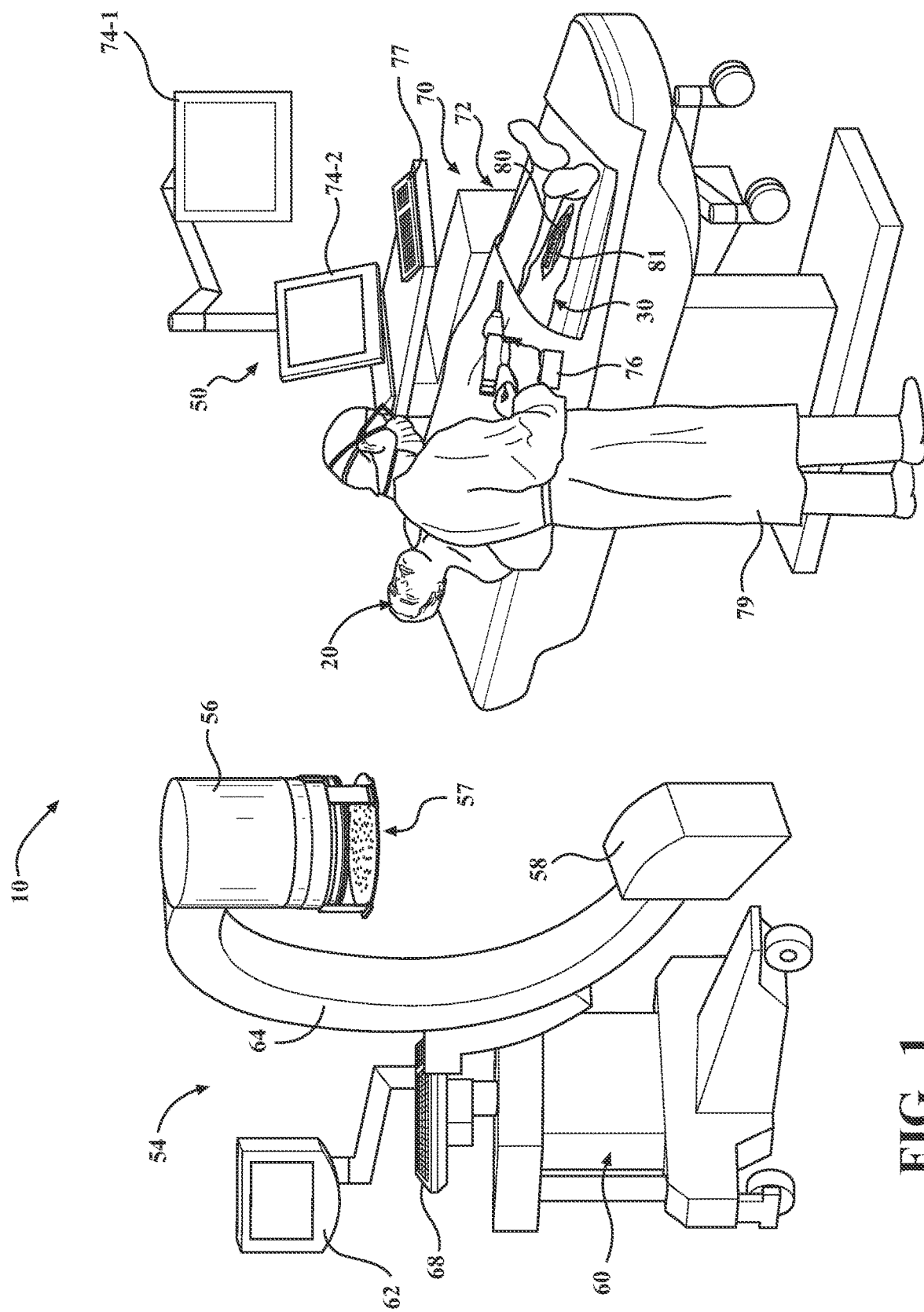
FIG. 1 is a perspective view of an exemplary layout of an operating room including a surgical system according to the teachings of the present disclosure.
Figure 2:
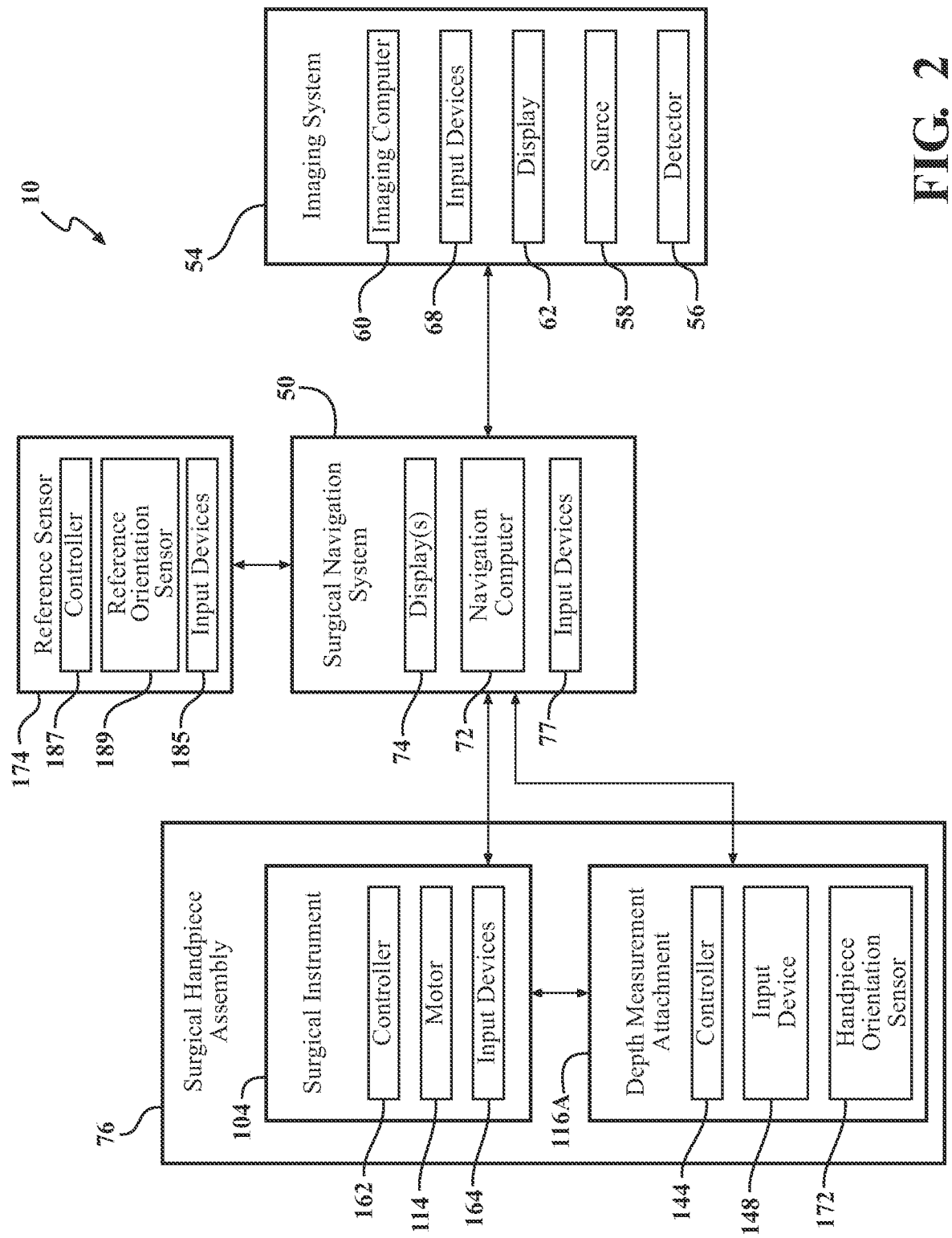
FIG. 2 is a functional block diagram of a surgical system according to the teachings of the present disclosure.

Referring to FIGS. 1 and 2, an exemplary configuration of an operating room or surgical suite for performing a medical procedure on a patient 20 using a surgical system 10 according to the teachings of the present disclosure. The surgical system 10 may be used to perform various orthopedic procedures such as ORIF procedures to realign a broken bone 81 and fixate the bone 81 in place with one or more surgical implants. The one or more surgical implants may include a bone plate 80 and screws which are inserted into the bone 81 until the bone 81 is healed. The surgical system 10 includes a surgical navigation system 50 including a cart assembly 72 that houses a navigation computer 70. The navigation computer 70 may also be referred to as the navigation controller.

A first navigation display 74-1 and a second navigation display 74-2 are in operative communication with the navigation computer 70. The first navigation display 74-1 and the second navigation display 74-2 may be referred to collectively as the navigation displays 74. The navigation computer 70 may be connected with one or more input devices 77 that are used to input information into the navigation computer 70 or otherwise to select/control certain aspects of the navigation computer 70. The one or more input devices 77 may include a keyboard, a mouse, a microphone (voice-activation), gesture control devices, or be integrated with the navigation displays 74, for example, including interactive touchscreen displays/menus, or the like. The functions of the navigation computer 70 discussed in this paragraph may also be implemented on a tablet computer or another suitable mobile device.

The surgical system 10 may also include an imaging system 54, such as a c-arm x-ray imaging device or another suitable imaging system, such as a CT or MRI imaging device. The imaging system 54 may comprise a detector 56, a source 58, an imaging computer 60, an imaging display 62, and one or more user input devices 68. The detector 56 and the source 58 are configured to generate one or more medical images. The detector 56 and the source 58 may be arranged at opposite ends of the c-arm 64. The source 58 may include any source used in diagnostic medical imaging that emits or generates x-rays, such as, a solid state X-ray emission source, a rotating anode X-ray source, a stationary or fixed anode X-ray source, a standard X-ray source, a solid state X-ray emission source, and/or a fluoroscopic X-ray source, and a stationary or fixed anode X-ray source. The detector 56 may include an image intensifier or any other energy receptor used in diagnostic medical imaging.

The c-arm 64 including the detector 56 and the source 58 may be configured to rotate about the patient 20 to produce images of the surgical site 30. The imaging computer 60 may be connected with the one or more user input devices 68, including a keyboard, a mouse and other suitable devices, that allow the user to provide input to the imaging computer 60. The imaging computer 60 and/or the navigation computer 70 may include software, as is known by those skilled in the art, which is capable of taking the images captured by the imaging system 54 and producing one or more 2-D images and/or one or more 3-D models of the surgical site 30. The imaging display 62 may be configured to display the resulting 2-D image and/or 3-D model.

Images from the imaging system 54, such as the c-arm x-ray imaging device, may often be warped (i.e., distorted) such that all the objects in the image may not be scaled identically. This is because x-ray beams are not perfectly linear. Often, objects that are closer to the source 58 appear larger (and include more pixels). Objects that are further from the source 58 may appear smaller (and include less pixels). In order to make accurate measurements, the images need to be de-warped.

Figure 3:
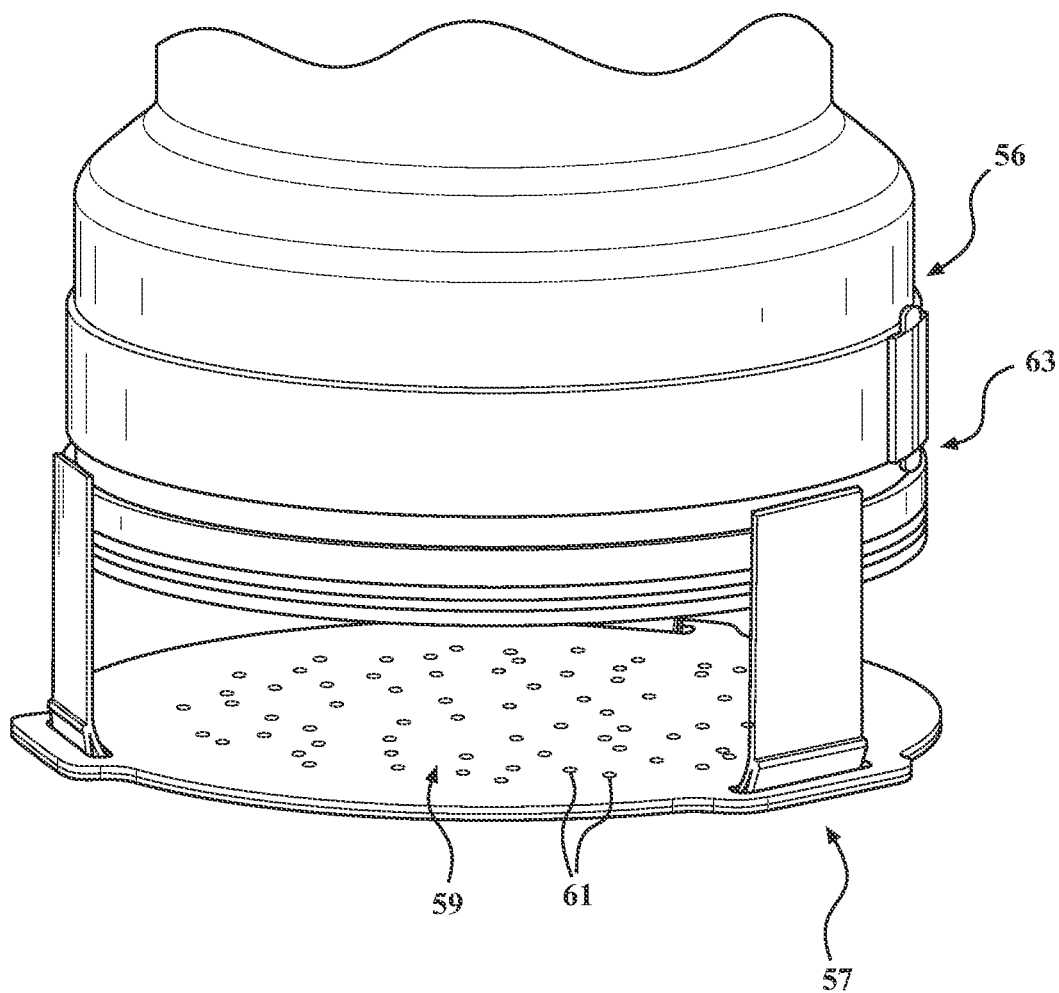
FIG. 3 is a perspective view of a detector of an imaging system including a FluoroDisc according to the teachings of the present disclosure.
Figure 4:
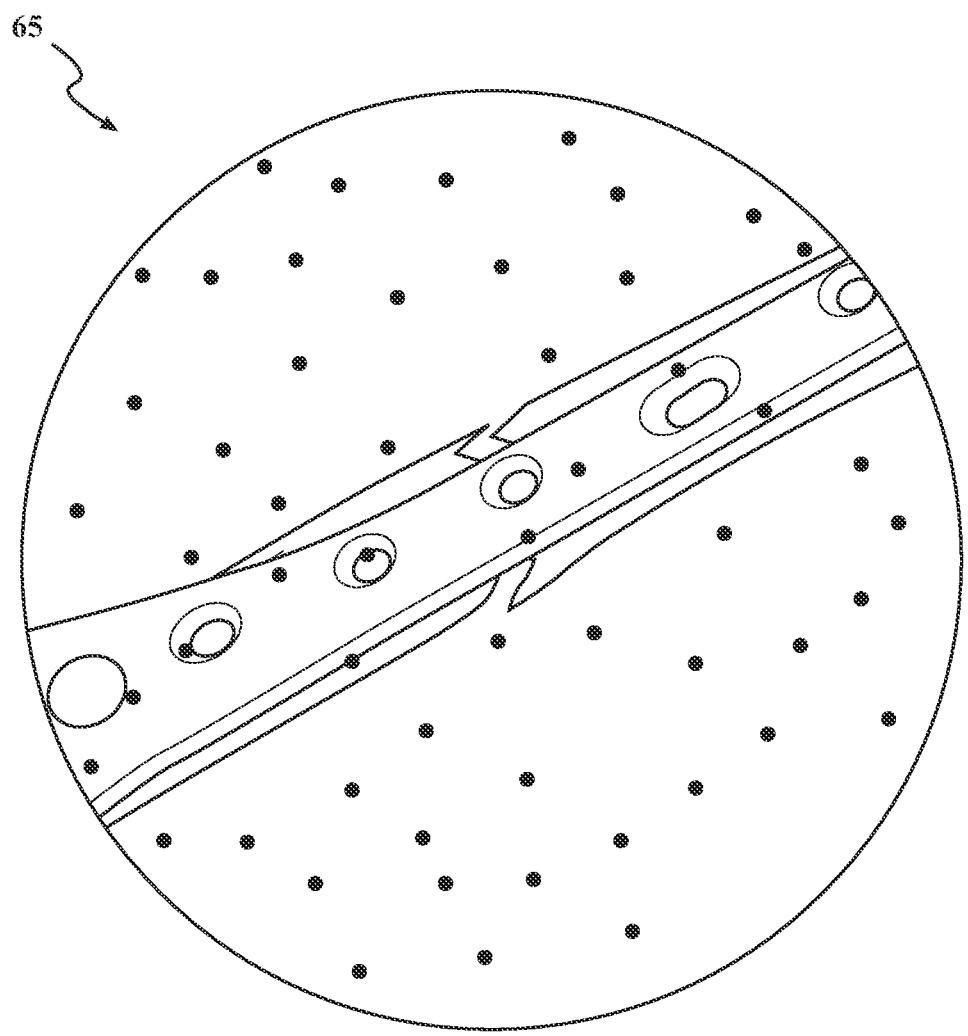
FIG. 4 is virtual representation of a plurality of fiducial markers imposed on a medical image according to the teachings of the present disclosure.
Figure 5:
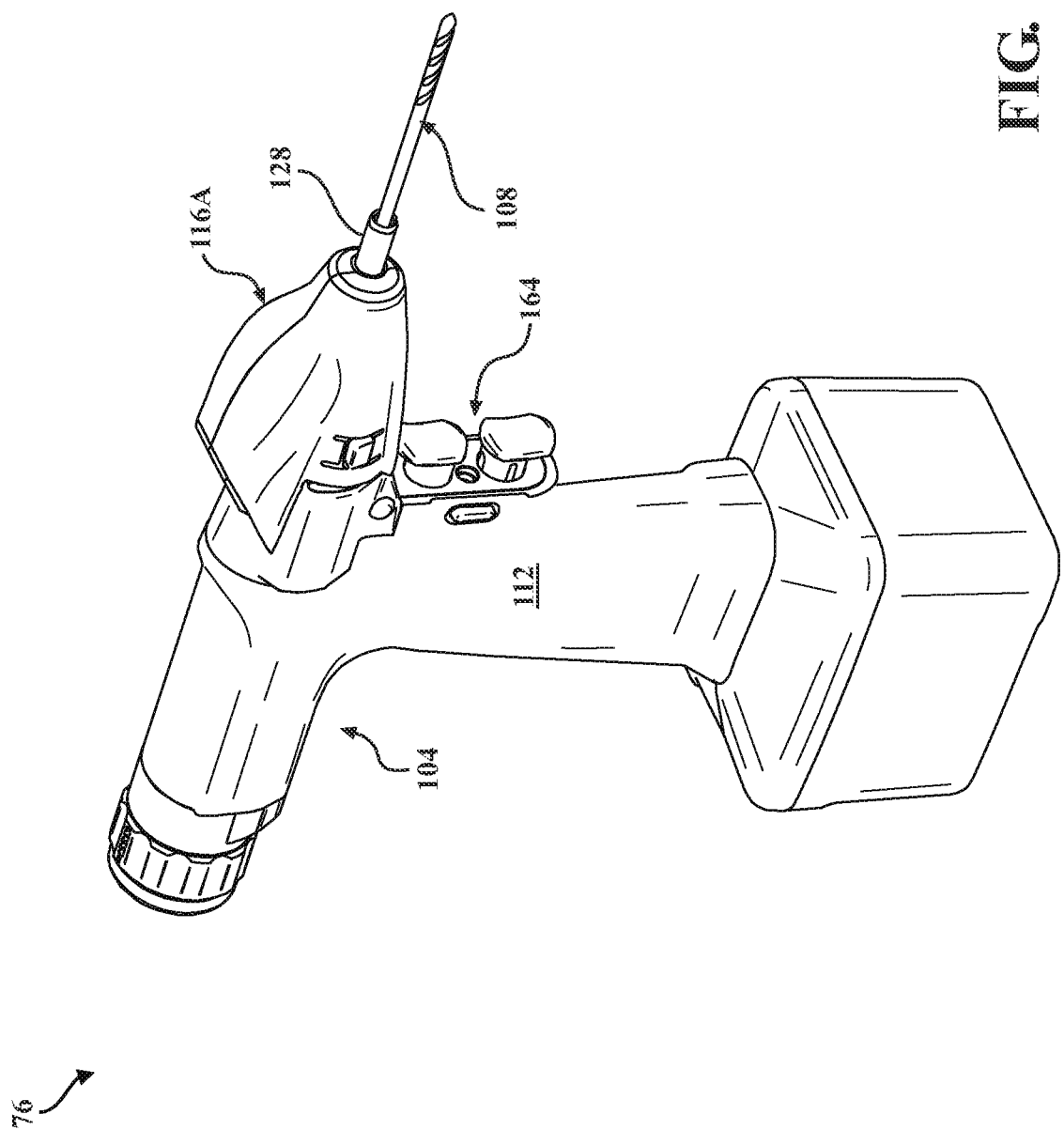
FIG. 5 is a perspective view of a surgical handpiece assembly including a surgical instrument with a depth measurement attachment for drilling a bone according to the teachings of the present disclosure.

With reference to FIGS. 3 and 4, the surgical system 10 may also include a FluoroDisc 57 to provide a de-warping function. The FluoroDisc 57 is discussed in FluoroMap™ Adaptive Positioning Technology For Gamma3™ System—User Manual, the contents which are hereby incorporated by reference in its entirety (https://www.strykermeded.com/media/2325/gamma3-adapt-fluoromap.pdf). The FluoroDisc 57 is also discussed in U.S. Pat. Pub. No. 2018/0140309A1, entitled "Method And Apparatus For Treating A Joint, Including The Treatment Of Cam-Type Femoroacetabular Impingement In A Hip Joint And Pincer-Type Femoroacetabular Impingement In A Hip Joint", filed Nov. 18, 2016, the contents which are hereby incorporated by reference in its entirety. In addition to the functions discussed herewith, the imaging computer 60 and/or navigation computer 70 may implement one or more systems, methods, and/or algorithms discussed in the aforementioned references.

The FluoroDisc 57 may include a transparent lens 59, a plurality of fiducial markers 61 disposed on the transparent lens 59, and an attachment member 63 configured to attach the FluoroDisc 57 to the detector 56 of the imaging system 54. The FluoroDisc 57 may have any suitable dimension (more specifically, the transparent lens 59), for example, a 9-inch diameter, a 12-inch diameter, etc. The attachment member 63 may include a combination of a belt, one or more hooks, and one or more loops. The plurality of fiducial markers 61 have known dimensions. The FluoroDisc 57 may be configured to provide a de-warping function by projecting a pattern of the plurality of fiducials 61 onto the image. In FIG. 4, a virtual representation 65 of the plurality of fiducials 61 projected onto the bone 81 is shown. While the example is provided that the imaging system 54 includes a FluoroDisc 57, in some implementations such as when the imaging system 54 includes a flat panel detector, the imaging system 54 may automatically provide de-warped images and thus the FluoroDisc 57 may be omitted. Based on the pattern projected onto the images, the imaging computer 60 and/or the navigation computer 70 may calibrate the appropriate pixel size based on the de-warped image.

In some implementations, the imaging computer 60 and/or the navigation computer 70, may use the known dimensions of the plurality of fiducial markers 61 for various other calculations. For example, the distance between the patient 20 and the source 58 may change between images and thus the scaling factor or magnification factor may be different from one image to the next image. As such, the imaging computer 60 and/or navigation computer 70 may use the known dimensions of the plurality of fiducial markers 61 and/or radiopaque markers on the reference device to determine a scaling factor or magnification factor for each of the images. The imaging computer 60 and/or navigation computer 70 may also use the known dimensions of the plurality of fiducials 61 to determine an orientation of the c-arm 64 with respect to the plurality of fiducial markers 61.

The imaging computer 60 may communicate with the navigation computer 70. The imaging computer 60 may be configured to communicate via a wired and/or a wireless connection with the surgical navigation system 50. For example, the imaging system 54 may be configured to provide the images, such as the resulting 2-D image and/or 3-D model of the surgical site 30, to the navigation computer 70. The navigation computer 70 may then be configured to provide the resulting 2-D image and/or 3-D model to the navigation displays 74, where a surgeon 79 or other medical professional may interact with the images to identify and/or define the corresponding regions and/or zones around the bone 81.

For example, the surgeon 79 via the one or more input devices 77, may select multiple views of the bone 81 to display, may define a desired trajectory for an end effector of the surgical handpiece assembly 76, and/or select an appropriate user interface for the navigation displays 74. While the source 58 and the detector 56 are shown as connected to the imaging computer 60, in some configurations, the x-ray imaging device including the detector 56 and the source 58 may be connected directly to the navigation computer 70, eliminating the need for the imaging computer 60, the imaging display 62 and user input devices 68. The navigation computer 70 may be configured to perform all the same functions as the imaging computer 60.

The surgical system 10 may include a surgical handpiece assembly 76. The surgeon 79 may use the surgical handpiece assembly 76 to operate on the patient 20 including to bore a hole in the bone 81 of the patient 20 and/or to insert screws through one or more openings 82 of the bone plate 80 into the borehole of the bone 81. Conventional surgical navigation systems commonly use optical tracking systems or electromagnetic tracking systems or a combination thereof in order to track a position of the end effector of the surgical handpiece assembly 76 with respect to the bone 81 of the patient 20. Such systems each have their own drawbacks, both systems can be time consuming to set up and costly. A particular drawback of optical tracking systems is that they require line-of-sight between the optical trackers and the position tracking unit (i.e., a camera) which can be difficult to maintain in an operating room. A particular drawback of electromagnetic tracking systems are they are less accurate than optical tracking systems and susceptible to distortion from surrounding metal objects. Both systems also require the surgeon 79 to go through a manual registration process which can be time consuming.

During ORIF and other trauma procedures, a surgeon 79 may not use conventional navigation guidance-tracking systems due to the above-mentioned drawbacks. Instead, a surgeon 79 may rely on his/her procedural skills and anatomical knowledge to align a trajectory of an end effector of the surgical handpiece assembly 76 to create a pilot hole for one or more screws (or other surgical implants). Similarly, during placement of the screws, the surgeon 79 inserts the screws freehand. The surgeon 79 then typically verifies placement of the screws using fluoroscopy. If the surgeon 79 is not satisfied with the placement of the screws, the surgeon 79 may replace the screws. This leads to extra damage to the bone 81, as the surgeon 79 has to drill additional holes in the bone 81. Improper placement of the screws also costs extra money and wastes time, as the screws may be damaged and re-drilling and reverification is time consuming.

According to the teachings of the present disclosure, the surgical system 10 may include a trajectory tracking system that is configured to track a real-time orientation (i.e., three degree of freedom rotational position) of the surgical handpiece assembly 76 (more specifically the end effector) without specifically tracking the position (i.e., three degree of freedom translational position) of the surgical handpiece assembly 76 as is common with conventional tracking systems, such as an optical tracking system and/or electromagnetic tracking system. The surgical system 10 may optionally be configured to track a non-traditional fourth degree of freedom for translational position pertaining to displacement of the end effector of the surgical handpiece assembly 76.

With additional reference to FIGS. 5-10, one exemplary surgical handpiece assembly 76 is shown. The surgical handpiece assembly 76 eliminates the necessity for a second device, such as a depth gauge to determine a bore-hole depth. The surgical handpiece assembly 76 comprises a surgical instrument 104, a depth measurement attachment 116A, and an end effector 108, such as a drill bit. The surgical handpiece assembly 76 is discussed in International Patent Publication No. WO2017/0407172 entitled "Powered Surgical Drill With Integral Depth Gauge That Includes A Probe That Slides Over A Drill Bit", filed on Sep. 1, 2016 and International Patent Publication No. WO2019/035096A1 entitled "Surgical Handpiece For Measuring Depth Of Bore Holes And Relates Accessories", filed on Aug. 17, 2017, which are hereby incorporated by reference in their entireties.

The surgical instrument 104 may include a housing 112, a motor 114, a surgical handpiece controller 162, one or more user input devices 164, a battery and other components as described in greater detail below. The user input device 164 may have a trigger-style configuration. The user input device 164 is responsive to actuation by a user (e.g., a surgeon 79), and communicates with the surgical handpiece controller 162, such as via electrical signals produced by magnets and Hall effect sensors. Thus, when the surgeon 79 actuates the user input device 164 to operate the surgical handpiece assembly 76, the surgical handpiece controller 162 directs power from the battery to the motor 114 which, in turn, generates rotational torque employed to rotate an end effector 108 or other surgical end effector, as described in greater detail below.

Figure 6:
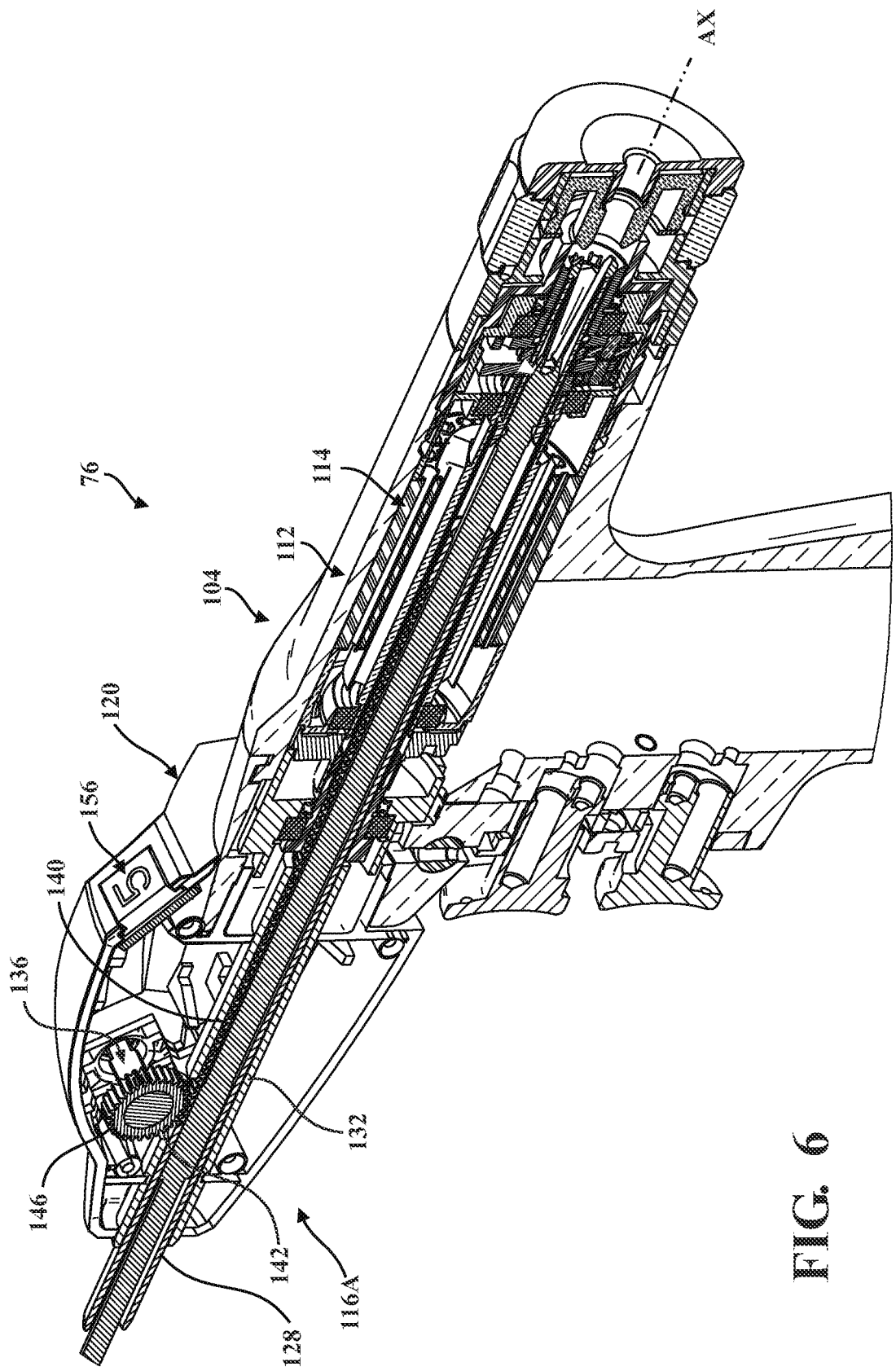
FIG. 6 is a cross-sectional and partial perspective view of the surgical handpiece assembly of FIG. 5.
Figure 7:
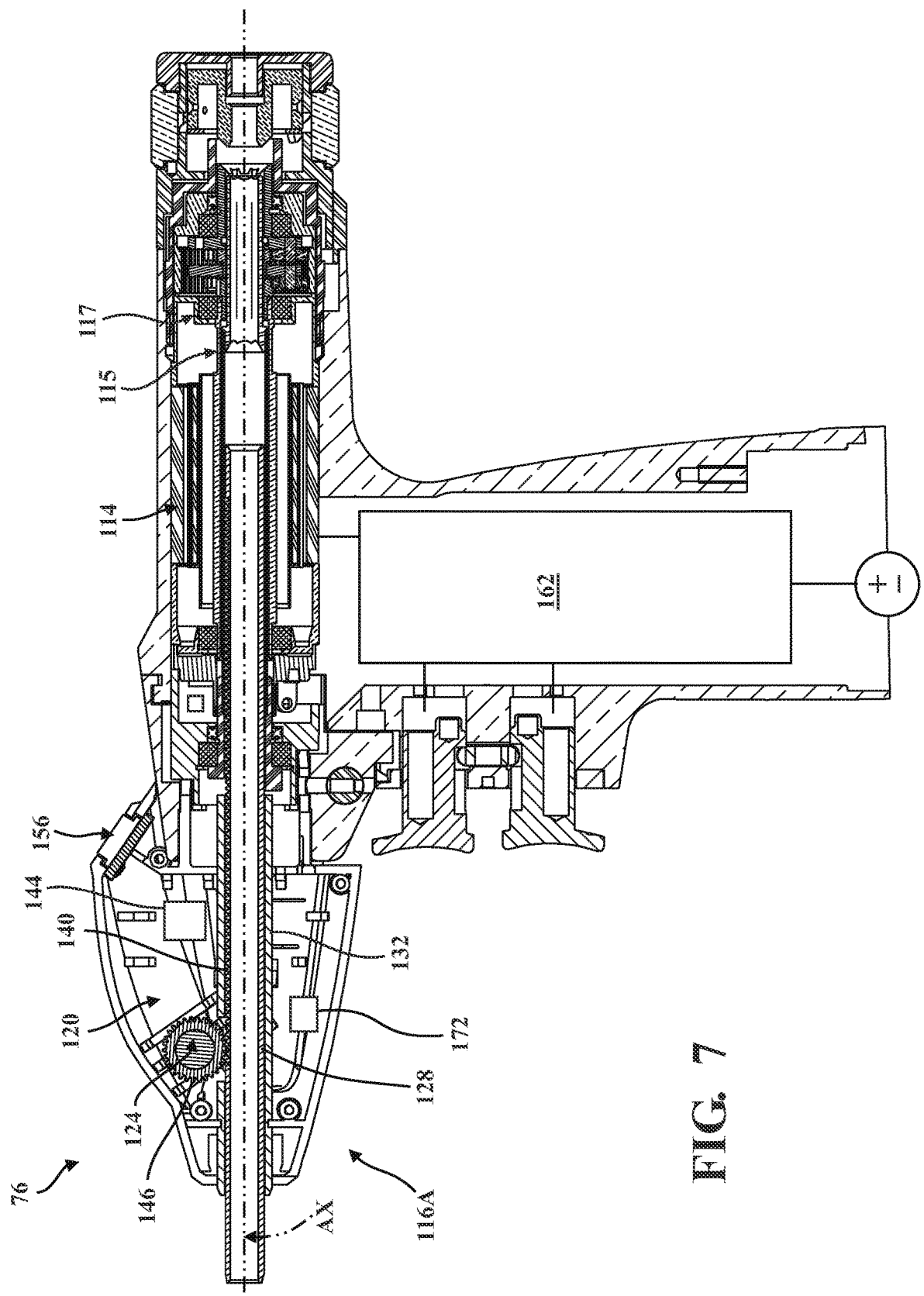
FIG. 7 is a schematic view of a surgical handpiece assembly according to the teachings of the present disclosure.

FIGS. 6 and 7 show the motor 114 positioned along the proximal/distal axis AX within the housing 112, but other motor positions are contemplated. The motor 114 can be electric, pneumatic, or hydraulic. The motor 114 is configured to selectively generate rotational torque in response to commands, signals, and the like received from the surgical handpiece controller. The motor 114 comprises a rotor cannula 115 supported for rotation about the axis AX by a pair of bearings 117. A drive gear arranged adjacent to the gearset is coupled to and rotates concurrently with the rotor cannula 115 and is employed to transmit rotational torque to the gearset.

In the illustrated examples, the depth measurement attachment 116A is removably coupled to the housing 112. However, the depth measurement attachment may be integrally formed with the housing 112. The depth measurement attachment 116A may comprise a distinct housing such as a module housing 120. The depth measurement attachment 116A may be constructed in a manner to minimize the obstruction of the view of the surgical site for the surgeon 79. The depth measurement attachment 116A may further comprise a displacement sensor 124 and a depth measurement extension 128. The displacement sensor 124 is operably connected to a depth measurement extension 128. As shown, the depth measurement extension 128 is a cannula.

The depth measurement extension 128 is disposed within the guide bushing 132 and is supported for translational movement along a measurement axis MX. When the depth measurement attachment 116A is attached to the surgical handpiece assembly 76, the measurement axis MX is arranged to be coaxial with the axis AX. An elongated recessed slot 143 is optionally formed transversely into the depth measurement extension 128 and extends longitudinally. The depth measurement extension 128 further comprises a plurality of rack teeth 140 disposed linearly along at least a partial length of the depth measurement extension 128 which are disposed in meshed engagement with the gear 146 arranged adjacent a distal end of the guide bushing 132. As shown in FIG. 6, the window of the guide bushing 132 is arranged adjacent to the gear 146 to facilitate the meshed engagement between the rack teeth 140 and the gear 146 such that rotation of the gear 146 and movement of the depth measurement extension 128 are directly proportional. The displacement sensor 124 is responsive to rotation of the gear 146 resulting from axial movement of the depth measurement extension 128, and may be realized with a potentiometer, a rotary encoder, and the like, in order to generate electrical signals representing changes in the position of the depth measurement extension 128 along the measurement axis MX.

By way of example, in some configurations, the displacement sensor 124 may be disposed in communication with the surgical handpiece controller 162 or a depth measurement attachment controller 144, which may be configured to interrupt or adjust how the motor 114 is driven based on movement of the depth measurement extension 128, such as to slow rotation of the end effector 108 at a specific drilling depth into tissue.

Figure 8:
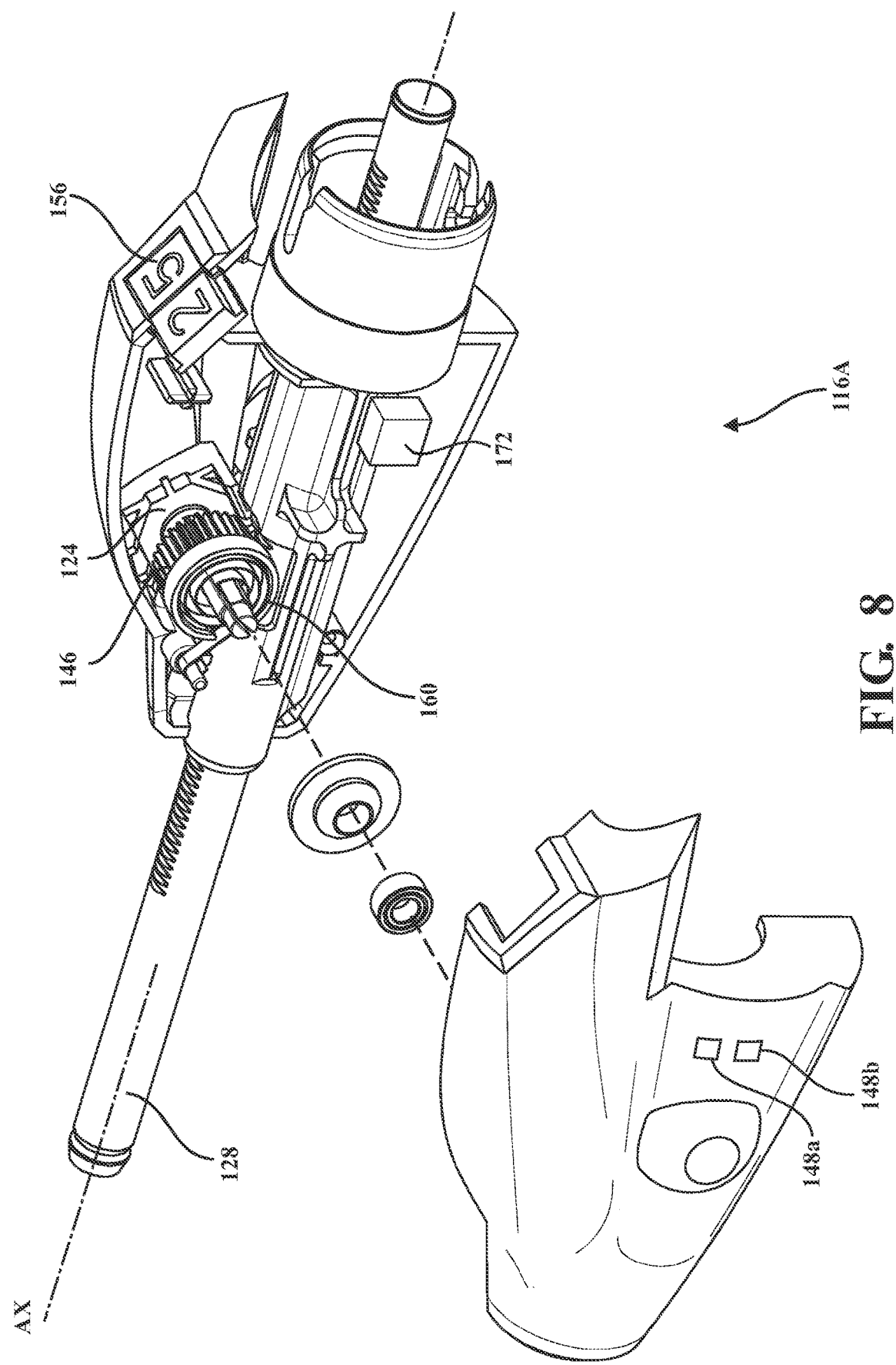
FIG. 8 is a partially exploded view of a depth measurement attachment according to the teachings of the present disclosure.

With reference to FIG. 8, in order to ensure that there is proper function of the depth measurement extension 128 and the displacement sensor 124, the depth measurement extension 128 may be biased towards an extended position. Through this bias, the distal end of the depth measurement extension 128 always maintains contact with the proximal surface of the bone 81 to be drilled, or the bone plate 80 which abuts the bone 81 to be drilled. This bias is achieved by use of a spring 160 that biases the rotatable gear 146 in such a way as to rotate the gear 146 in the direction to extend the depth measurement extension 128 distally out of the module housing 120. However, other ways of biasing the depth measurement extension 128 relative to the surgical instrument 104 are contemplated.

Figure 9:
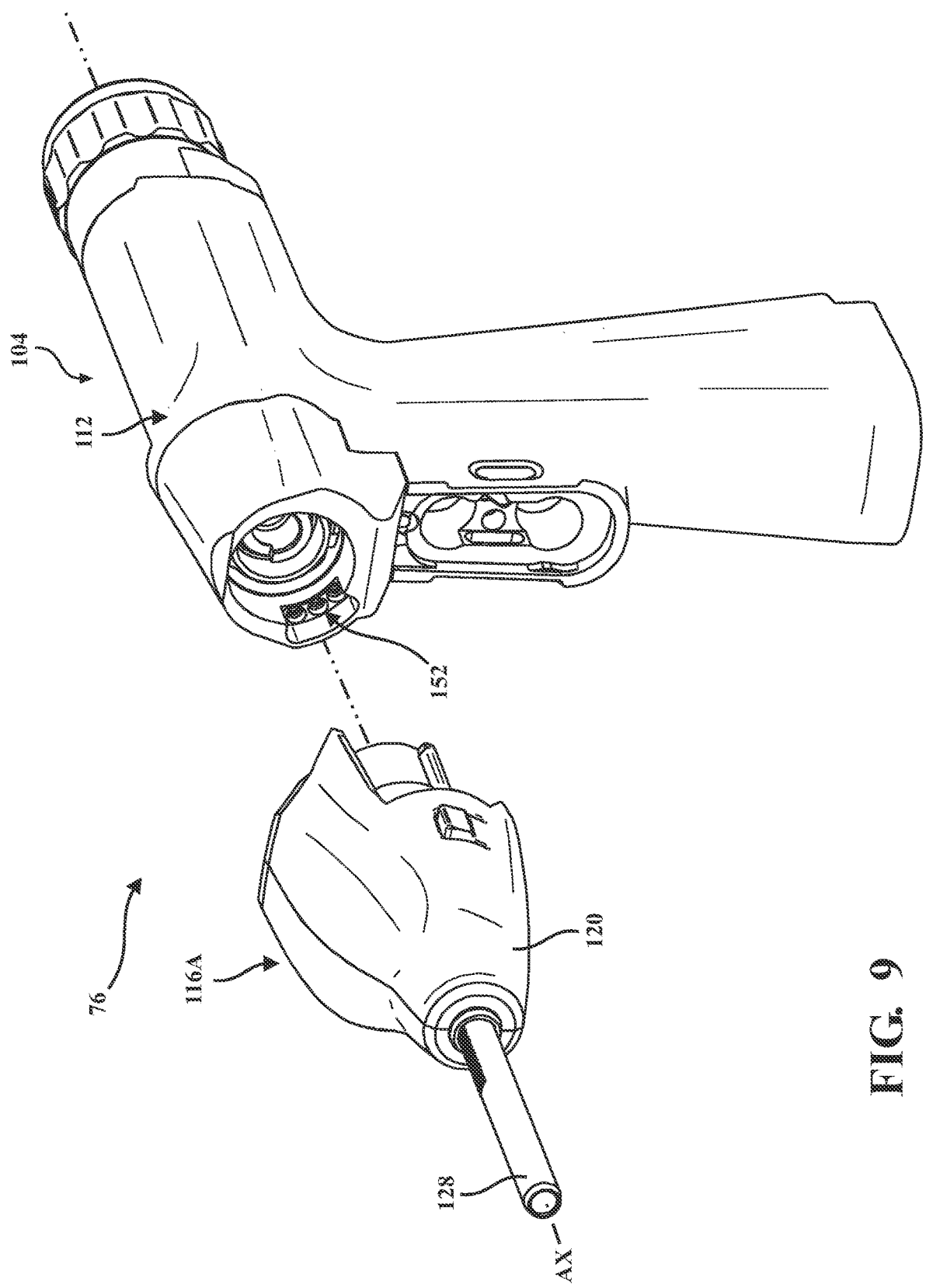
FIG. 9 is a perspective view of a surgical handpiece assembly with a depth measurement attachment separated from a surgical instrument according to the teachings of the present disclosure.
Figure 10:
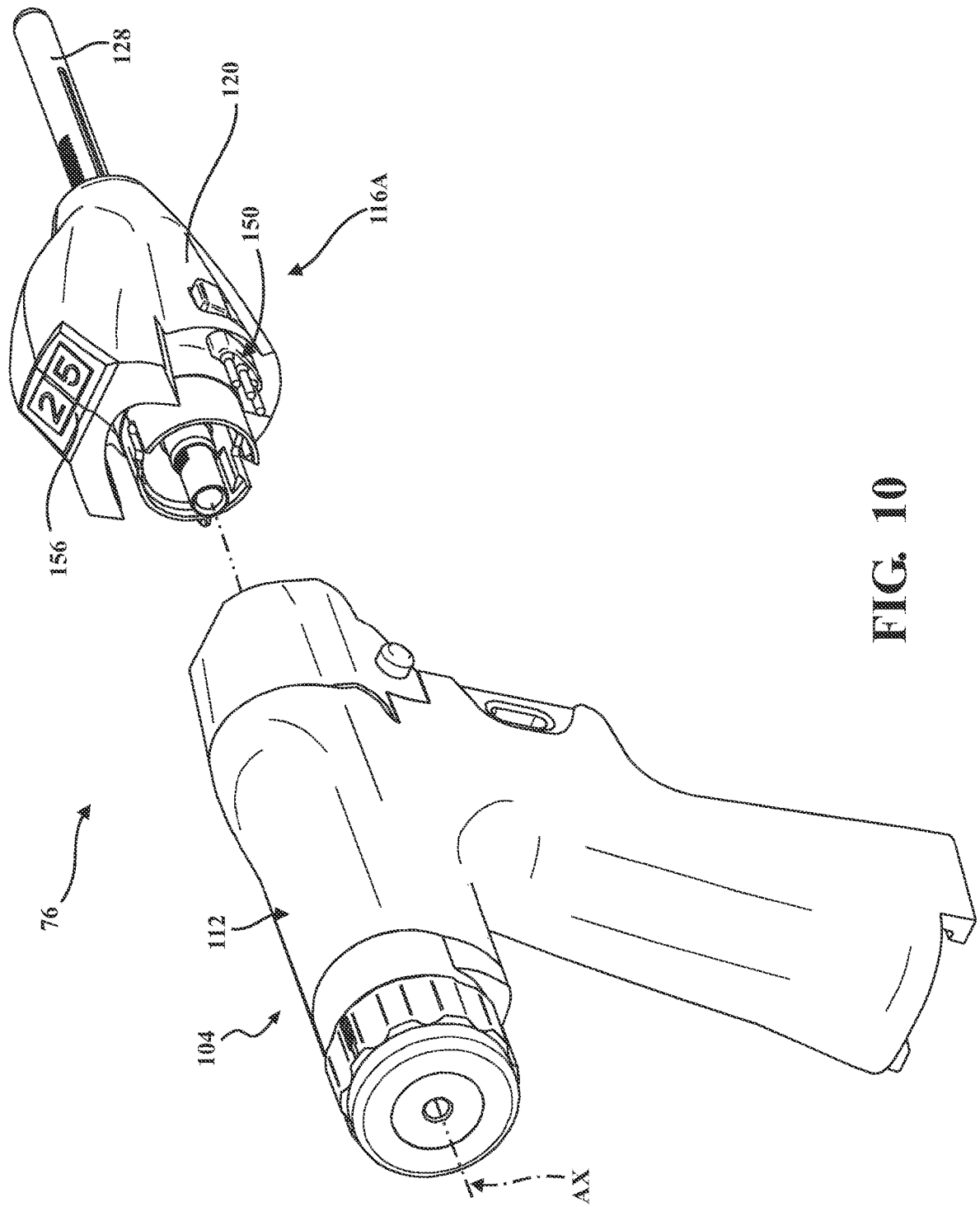
FIG. 10 is a perspective view of a surgical handpiece assembly with a depth measurement attachment separated from a surgical instrument according to the teachings of the present disclosure.

With reference to FIGS. 9 and 10, the depth measurement attachment 116A may include housing connectors 150 that are configured to operably connect with instrument connectors 152 of the surgical instrument 104. In one example, the surgical instrument 104 may provide the depth measurement attachment 116A with a power connection only via the connection between the instrument connectors 152 and the housing connectors 150. In another example, the depth measurement attachment 116A and the surgical instrument 104 may also exchange data via the instrument connectors 152 and the housing connectors 150. The depth measurement attachment controller 144 and the surgical handpiece controller 162 may communicate over a wired connection (i.e., through the housing connectors 150 and the instrument connectors 152) or a wireless connection with the navigation computer 70 or other devices. For example, the surgical handpiece controller 162 may send data to a remote device, such as a tablet or external server.

The depth measurement attachment 116A may also include a display 156, such as a display screen, one or more light-emitting diodes (LEDs), and the like, to provide the surgeon 79 with information relating to movement of the depth measurement attachment 116A, such as to display a real-time drilling depth, a recorded historical maximum drilling depth, a screw length, a breakthrough indication, visual information (e.g., a graphical representation) related to a current trajectory relative to a desired trajectory for guiding the surgeon 79 to align the desired and the like. This same information may also be communicated to the user with a speaker, so as to provide audio indications of the real-time drilling depth, a recorded historical maximum drilling depth, a breakthrough indication and the like.

The depth measurement attachment controller 144 may also be configured to determine the breakthrough event based on the displacement signal. The depth measurement attachment controller 144 and the surgical handpiece controller 162 are shown as separate controllers being disposed within the depth measurement attachment 116A and the surgical instrument 104, respectively, the depth measurement attachment controller 144 and the surgical handpiece controller 162 may be housed in a remote device. The depth measurement attachment controller 144 and the surgical handpiece controller 162 may also be integrated into a single controller.

With reference back to FIGS. 7 and 8, the surgical handpiece assembly 76 may also include a handpiece orientation sensor 172. In one exemplary configuration, the handpiece orientation sensor 172 may be included as part of the depth measurement attachment 116A. The depth measurement attachment controller 144 may be operably connected to the handpiece orientation sensor 172.

The handpiece orientation sensor 172 generates the handpiece orientation signals that the navigation computer 70 can use to derive an orientation of the surgical handpiece assembly 76, more specifically, the orientation of the depth measurement attachment 116A and the axis AX. The handpiece orientation signals may be indicative of angular velocity of the handpiece orientation sensor 172 with respect to a handpiece coordinate system.

In an exemplary configuration, the handpiece orientation sensor 172 includes three single axis gyroscopes arranged in a manner as to sense angular velocities of three orthogonal axes, such as an x-axis of the depth measurement attachment 116A or the surgical instrument 104, a y-axis of the depth measurement attachment 116A or the surgical instrument 104, and z-axis of the depth measurement attachment 116A or the surgical instrument 104. The x-axis, y-axis, and z-axis of the handpiece orientation sensor 172 may be referred to as the handpiece coordinate system and the angular velocity of the x-axis, the angular velocity of the y-axis, and the angular velocity of the z-axis may be referred to collectively as the handpiece orientation signals throughout this disclosure. For example, a first gyroscope may be configured to sense angular velocity of an x-axis (i.e., a roll axis) the handpiece orientation sensor 172, a second gyroscope may be configured to sense angular velocity of a y-axis (i.e., a pitch axis) of the handpiece orientation sensor 172, a third gyroscope may be configured to sense angular velocity of a z-axis (i.e., a yaw axis) of the handpiece orientation sensor 172.

While the sensors of the handpiece orientation sensor 172 are contemplated as gyroscopes, the sensors may also be inertial measurement units that include accelerometers and/or magnetometers and that are capable of sensing in six degrees of freedom. While the handpiece orientation sensor 172 is described as including three gyroscopes, any number of gyroscopes may be included. In another exemplary configuration, the first, second, and third gyroscopes may be replaced with a triple axis gyroscope. The handpiece orientation sensor 172 may also include a controller that is configured to transmit the handpiece orientation signal directly to the navigation computer 70 and or indirectly to the navigation computer 70 such as through the depth measurement attachment controller 144 or the surgical handpiece controller 162.

The handpiece orientation sensor 172 is configured to have a fixed pose (i.e., position and orientation) with respect to the surgical handpiece assembly 76. In some examples, the handpiece orientation sensor 172 is disposed within the depth measurement attachment 116A, such as shown in FIG. 8 or within the housing 112 of the surgical handpiece assembly 76. The handpiece orientation sensor 172 may also be disposed within another attachment, such as one of the attachments described with respect to FIG. 11.

In other examples, handpiece orientation sensor 172 is configured to be releasably attached to any portion of the surgical handpiece assembly 76 such as to the depth measurement attachment 116A or the surgical instrument 104. As such, the depth measurement attachment 116A may include any suitable coupler for coupling with the handpiece orientation sensor 172. The coupler may be a clamp, clip, or another suitable coupler. For example, the handpiece orientation sensor 172 may be coupled to an external surface of the depth measurement attachment 116A or the housing 112 of the surgical instrument 104.

The depth measurement attachment controller 144 may communicate with a handpiece orientation sensor 172 to control operation of the handpiece orientation sensor 172 based on user input. For example, user input may be received via one or more input devices 148 of the depth measurement attachment 116A, such as a first button 148a and a second button 148b. The first button 148a may power on/off the handpiece orientation sensor 172 and the second button 148b may zero the handpiece orientation sensor 172. The handpiece orientation sensor 172 may receive power from the surgical instrument 104 and not need a separate power source when disposed within the depth measurement attachment 116A. While not shown in the illustration of FIG. 2, the handpiece orientation sensor 172 may have a dedicated controller which controls operation of the handpiece orientation sensor 172 based on user input to the first button 148a or the second button 148b. In other implementations, another controller such as the depth measurement attachment controller 144 may control operation of the handpiece orientation sensor 172.

In configurations where the handpiece orientation sensor 172 is not disposed inside of the depth measurement attachment 116A, the handpiece orientation sensor 172 may also include a housing, one or more input devices, and a power source, such as a battery. The one or more input devices may include a first button and a second button configured to function similar to the first button 148a and the second button 148b of the depth measurement attachment 116A.

Figure 11:
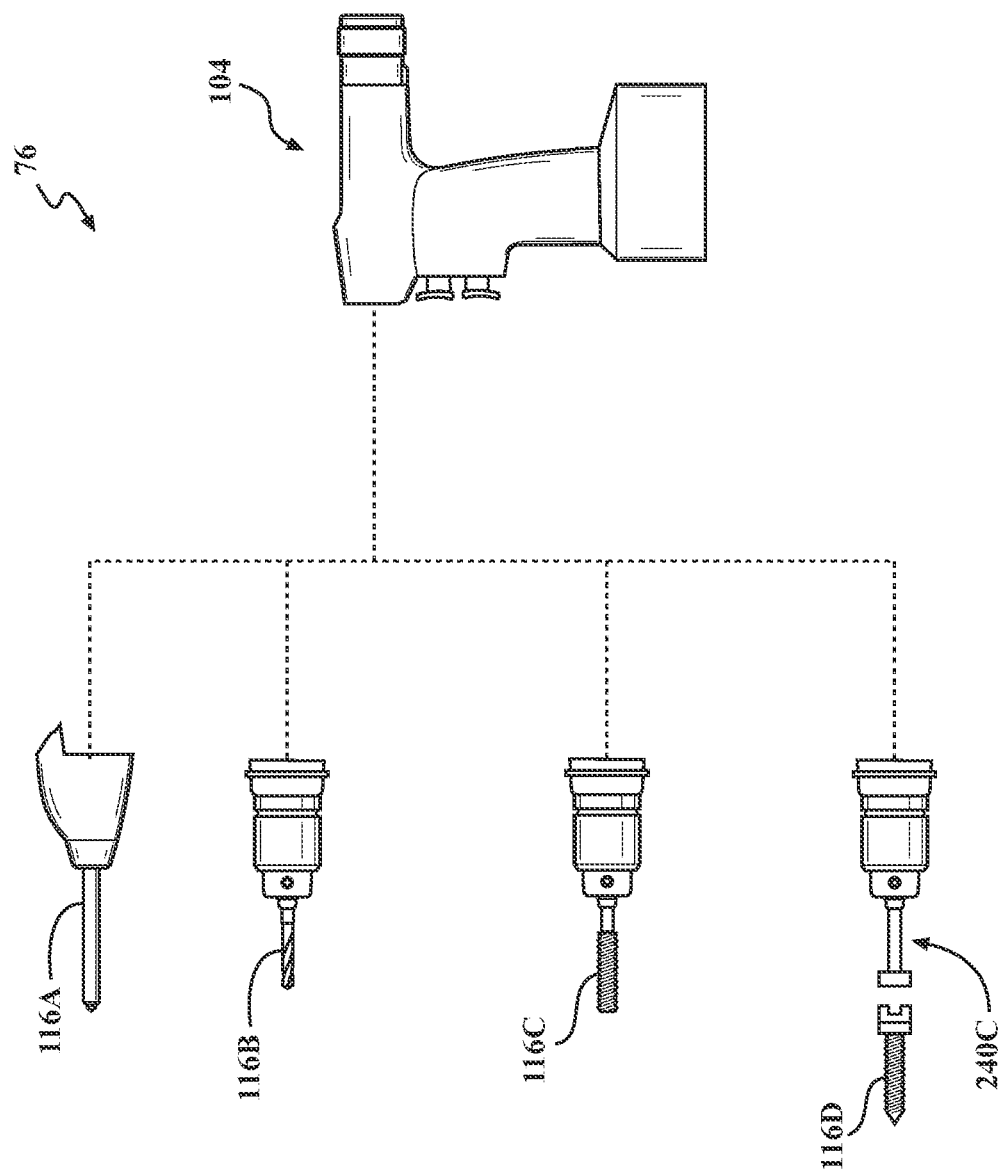
FIG. 11 is a schematic of an example surgical handpiece assembly including a surgical instrument and various attachments according to the teachings of the present discourse.

With reference to FIG. 11, in some cases, the depth measurement attachment 116A may not be used. In this case, the surgical instrument 104 may be coupled to a drill chuck 116B, a tap 116C for creating threads on the interior surface of a hole or aperture, or a driver 116D for driving or inserting a screw within the borehole or aperture of the bone 81. The handpiece orientation sensor 172 may be disposed within the housing of the drill chuck 116B, the tap 116C, or the driver 116D. The drill chuck 116B, the tap 116C, and the driver 116D may include the first button 148*a* and the second button 148*b* for controlling operation of the handpiece orientation sensor 172. Alternatively, the handpiece orientation sensor 172 may be coupled to an exterior surface of the drill chuck 116B, the tap 116C, or the driver 116D. As such, the drill chuck 116B, the tap 116C, and the driver 116D may include any suitable coupler for attaching the handpiece orientation sensor 172 to the exterior surface of the drill chuck 116B, the tap 116C, or the driver 116D.

Referring to FIGS. 12 and 13A-C, the tracking system may include a reference device 182 that defines at least one reference axis. The reference device 182 is configured to be affixed to the bone 81 and/or in some configurations the bone plate 80 may intervene between the bone 81 and the reference device 182. The reference device 182 may include one or more extensions 186 such as a first extension 186*a*, a second extension 186*b*, and a third extension 186*c*. Although the reference device 182 is illustrated with three extensions 186, the reference device 182 may include any number of extensions 186 or surfaces. The first extension 186*a*, the second extension 186*b*, and the third extension 186*c* may each have different dimensions, for example, different heights, lengths, and widths. The reference device 182 is not limited to the illustrated embodiment discussed throughout this disclosure and may include any design or configuration that may define at least one reference axis.

The reference device 182 may include one or more fiducial markers 188 arranged in a manner suitable for determining the pose of the reference device 182 when imaged. The fiducial markers 188 for example, may be radiopaque markers. For example, in one exemplary configuration, each of the first, second, and third extension 186*a*, 186*b*, and 186*c* may include fiducial markers 188 that are imageable by the imaging system 54. The first extension 186*a* may have a first set of fiducial markers 188*a*, the second extension 186*b* may have a second set of fiducial markers 188*b*, and the third extension 186*c* may have a third set of fiducial markers 188*c*. The first set of fiducial markers 188*a*, the second set of fiducial markers 188*b*, and the third set of fiducial markers 188*c* may each have distinctive fiducial markers 188. For example, a size, a shape, a number, and/or a spacing of the fiducial markers 188*a* of the first extension 186*a* may be different than the fiducial markers 188*b* of the second extension 186*b* and the fiducial markers 188*c* of the third extension 188*c*. The one or more fiducial markers 188 allow for the navigation computer 70 or the imaging computer 60 to calculate a pose (i.e., position and orientation) of the reference device 182 with respect to the bone 81 in an image-based coordinate system. The image-based coordinate system may define a shape and/or pose of the patient surface and/or bone plate 80 of the medical images. The one or more fiducial markers 188 may also allow the navigation computer 70 to calculate a rotation angle between the images.

Figure 12:
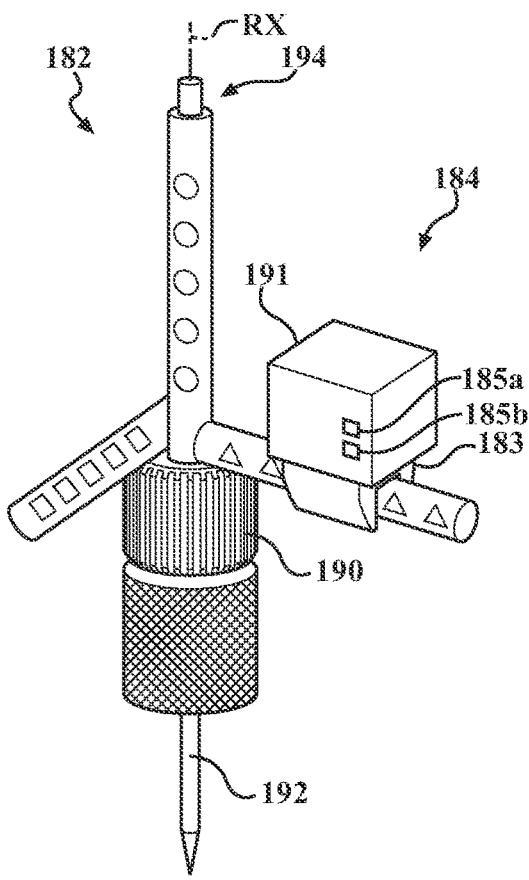
FIG. 12 is an example of a perspective view of a reference device with a reference sensor coupled to the reference device according to the teachings of the present disclosure.
Figure 13A:
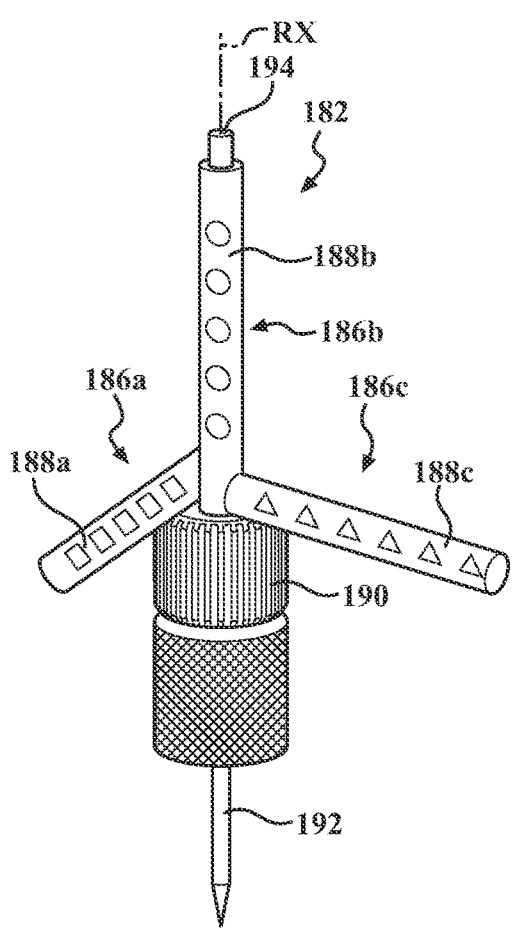
FIGS. 13A-C are perspective views of a first embodiment of a reference device and a second embodiment of a reference device according to the teachings of the present disclosure.

The reference device 182 may be formed with a surface 194 that defines the at least one reference axis. In some examples, as shown in FIGS. 12 and 13A, the surface 194 may be a protrusion such as a notch or a peg that is protruding from the second extension 186*b*. In this configuration, the depth measurement attachment 116A may be coupled to the protrusion. When the depth measurement attachment 116A is coupled to the protrusion, the depth measurement attachment 116A and the protrusion are concentric and this brings the measurement axis MX of the depth measurement attachment 116A in alignment with an axis of the protrusion which in turn allows for the two axes to be registered, which is described in greater detail below.

Figure 13B:
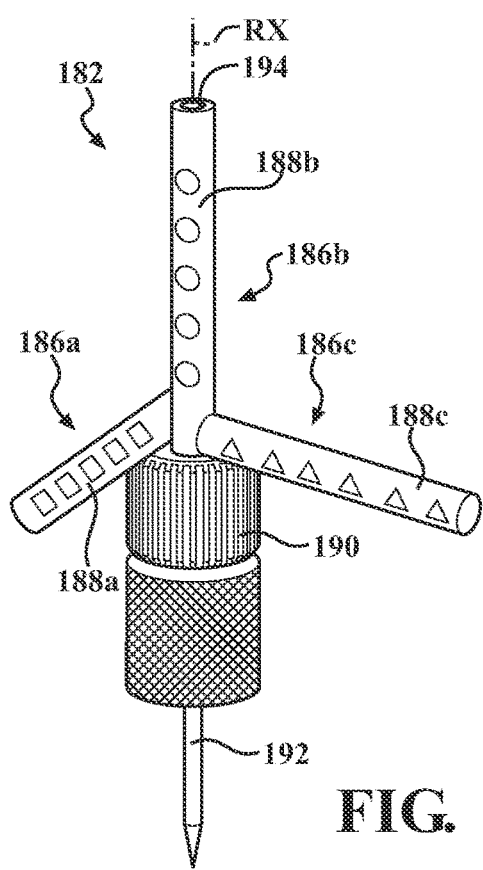
Figure 13C:
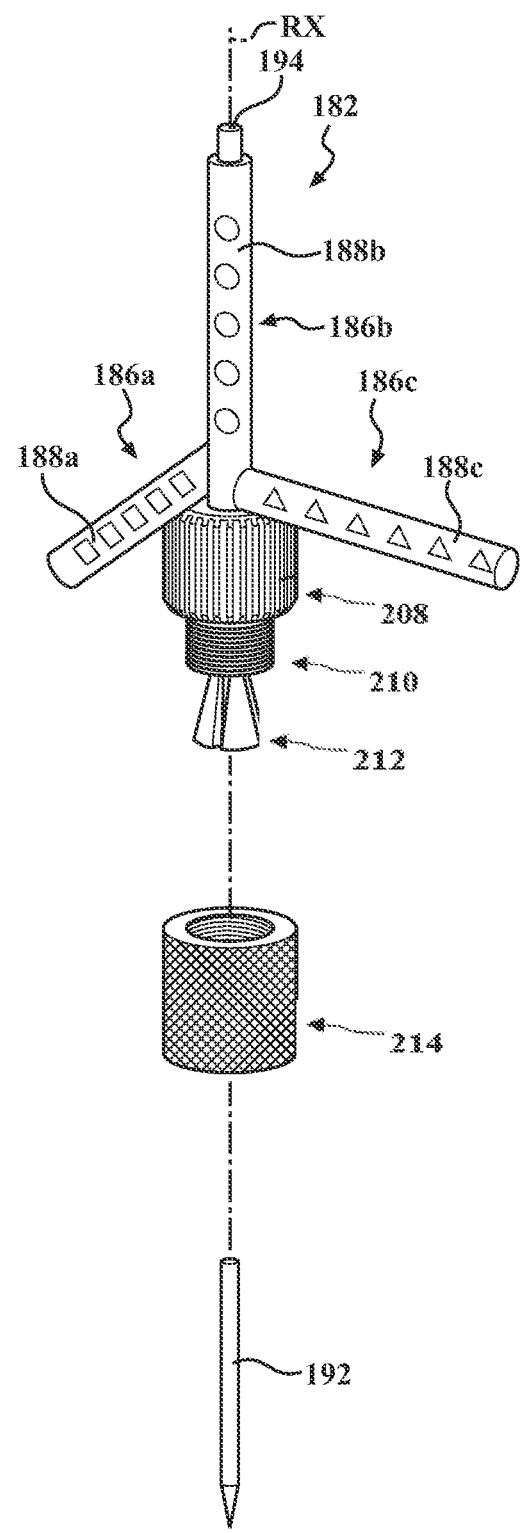

In other examples, as shown in FIG. 13B, the surface 194 is a tube or a cylindrical pocket in which the end effector 108 is inserted into in order to register the axis AX to an axis of the tube or cylindrical pocket. The one or more extensions 186 may be connected to a coupling portion 190. The coupling portion 190 may be configured to facilitate releasable attachment to the bone plate 80 or the bone 81 of the patient 20 via a fixation member 192, such as a Kirschner wire (k-wire), a pin, or another suitable fixation member.

Figure 14:
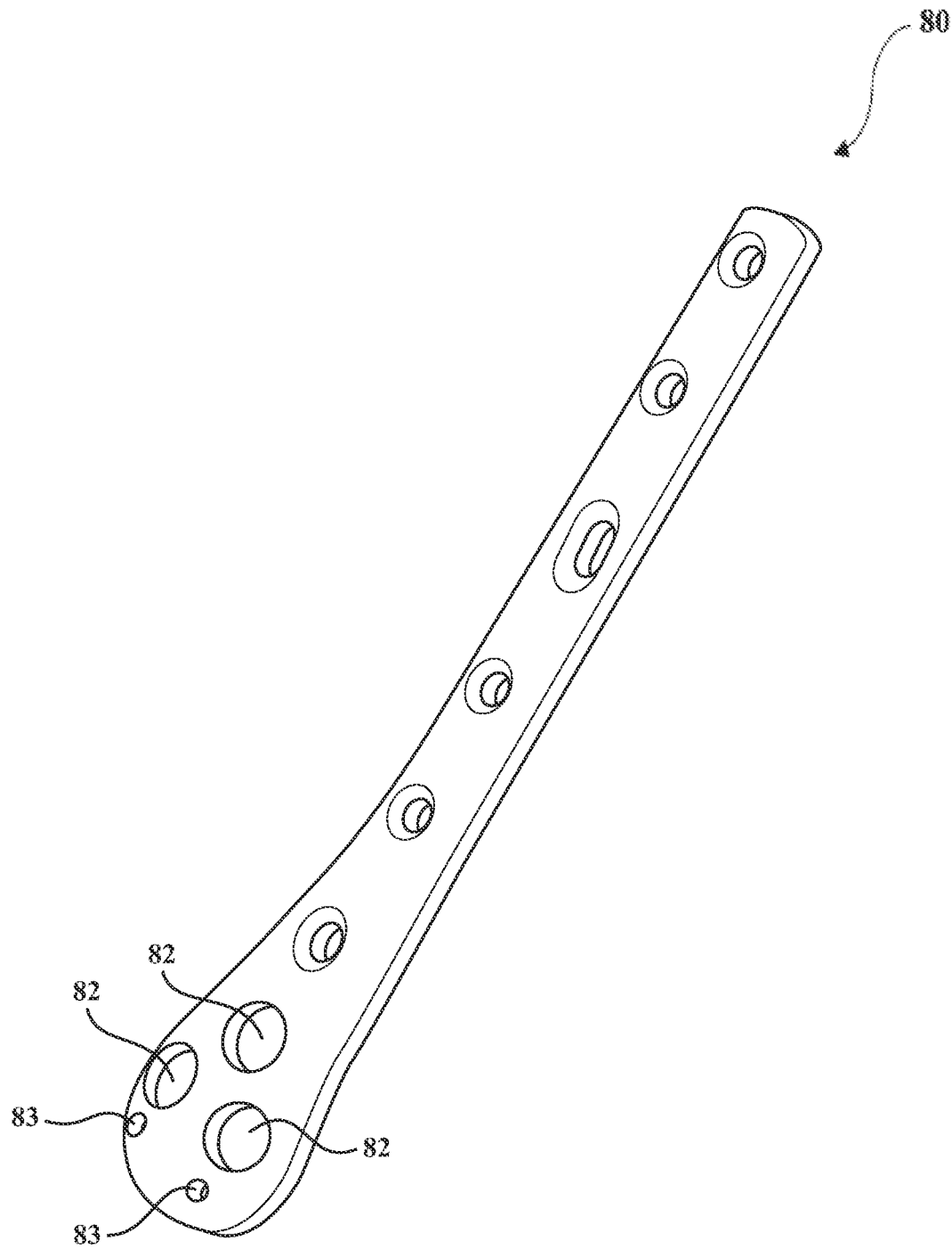
FIG. 14 is a schematic of an example bone plate according to the teachings of the present discourse.

With reference to FIG. 14, an exemplary bone plate 80 is shown. The bone plate 80 may be made of metal or another suitable material and is configured to immobilize a fractured bone such as the bone 81. As shown, the bone plate 80 may include a plurality of larger openings 82 and a pair of smaller openings 83. The surgeon 79 may first affix the bone plate 80 to the bone 81 with the fixation member 192 so that the bone plate 80 does not move prior to inserting the screws into the bone 81.

With reference back to FIGS. 12 and 13A-C, the fixation member 192 may be driven through either opening of the pair of smaller openings 83 and into the bone 81. Another portion of the k-wire (i.e., the side that is not driven into the bone 81) may serve as an anchor for the reference device 182. Once the fixation member 192 is fed through one of the pair of smaller openings 83 and driven into the bone 81, the reference device 182 may be coupled to the fixation member 192. The coupling portion 190 may include a finger support collar 208, a threaded portion 210, a collet 212, and a locking knob 214. The finger support collar 208 may be mounted or integrally formed with a bottom portion of the reference device 182. The threaded portion 210 may include male threads and may be mounted to the finger support collar 208 or integrally formed with the finger support collar 208.

The collet 212 may be mounted to the threaded portion 210 or integrally formed with the threaded portion 210. The collet 212 is configured to form a collar around the fixation member 192 in order to secure the reference device 182 to the fixation member 192. When the collar forms a collar around the fixation member 192, rotational and axial motion of the reference device 182 is prevented. While the example is provided that the coupling portion includes the collet 212 to secure the reference device 182 to the fixation member 192, any suitable member, element, device, may be used to secure the reference device 182 to the fixation member 192 such that the reference device 182 is unable to move independent of the fixation member 192.

The locking knob 214 may be configured to be coupled to the threaded portion 210. For example, the locking knob 214 may be shaped to define a passage that is configured to accept the threaded portion 210 and the collet 212. The locking knob 214 may include female threads on an inner surface. The threaded portion 210 and the locking knob 214 may form a mated pair. In some implementations, a dimension (e.g., height) of the threaded portion 210 and a dimension (e.g., height) of the collet 212, combined, may be roughly the same as a dimension (e.g., height) of the locking knob 214. The locking knob 214 may serve to cover the collet 212 such that the connection between the reference device 182 and the fixation member 192 remains secure and is not disrupted unintentionally throughout the procedure.

In other configurations even when the bone plate 80 is used in the surgical procedure, the reference device 182 may still be connected directly to the bone 81 without the bone plate 80 intervening. In such a configuration, the fixation member 192 may be inserted into the bone 81 near the bone plate 80 but not through either of the pair of openings 82, 83.

Once the bone plate 80 has been temporarily affixed to the bone 81, the surgeon 79 or other medical professional may image the patient 20 with the imaging system 54. The imaging system 54 then generates the images and any 3D models and transmits the images and/or 3D models to the navigation computer 70.

A reference sensor 184 is configured to be removably attached to the reference device 182. While the example is provided that the reference sensor 184 is removably attached to the reference device 182, in some instances, the reference sensor 184 may not be removably attached to the reference device 182 such as when the reference sensor 184 is integrally formed with the reference device 182. The reference sensor 184 generates reference device orientation signals that the navigation computer 70 may use to derive an orientation of the reference device 182. The reference device orientation signal may be indicative of angular velocity of the reference device 182 with respect to time. The integral of angular velocity with respect to time is a measure of the angular movement (i.e., orientation) of the reference device 182 (and the reference device coordinate system) since the time that the reference sensor 184 was last zeroed. For example, the reference sensor 184 may be zeroed at a time when the reference device 182 and the depth measurement extension 128 are brought into alignment. The reference sensor 184 may include a housing 191 that has an attachment member 183 integrally formed or mounted to the housing 191. The attachment member 183 may be in the form of a clamp, clip, or another suitable device for attaching the reference sensor 184 to the reference device 182. When releasably attached to the reference device 182, a pose (i.e., position and orientation) of the reference sensor 184 is fixed with respect to the reference device 182.

The reference sensor 184 may include a reference controller 187, an orientation sensor 189, one or more input devices 185, and a power source, such as a battery. In an exemplary configuration, the orientation sensor 189 includes three single axis gyroscopes. A first gyroscope may be configured to sense angular velocity of an x-axis reference sensor 184, a second gyroscope may be configured to sense angular velocity of a y-axis of the reference sensor 184, a third gyroscope may be configured to sense angular velocity of a z-axis of the reference sensor 184. The x-axis, y-axis, and z-axis of the reference sensor 184 may be referred to as the reference device coordinate system and the angular velocity of the x-axis, the angular velocity of the y-axis, and the angular velocity of the z-axis may be referred to collectively as the reference device orientation signals throughout this disclosure. While the sensors are contemplated as gyroscopes, the sensors may also be inertial measurement units that include accelerometers and/or magnetometers and that are capable of sensing in six degrees of freedom. While the orientation sensor 189 is described as including three gyroscopes, any number of gyroscopes may be included. In another exemplary configuration, the first, second, and third gyroscopes may be replaced with a triple axis gyroscope.

The reference controller 187 may control operation of the reference sensor 184 based on the one or more input devices 185 and control transmission of the reference device orientation signals to the navigation computer 70. The reference controller 187 may also communicate via wired or wireless connection with the depth measurement attachment controller 144 or the surgical handpiece controller 162. The one or more input devices 185 of the reference sensor 184 may be configured to control operation of the sensors. For example, a first button 185*a* of the one or more input devices 185 of the reference sensor 184 may be used to power on/off the reference sensor 184, to start/stop sensing, and a second button 185*b* of the one or more input devices 185 may be used to zero the reference sensor 184. In some instances, the reference sensor 184 may include an output. The output may include an LED, a display, or any other output device. The output may be configured to indicate the status of the reference sensor 184 and/or one or more other components of the system 10.

Figure 15:
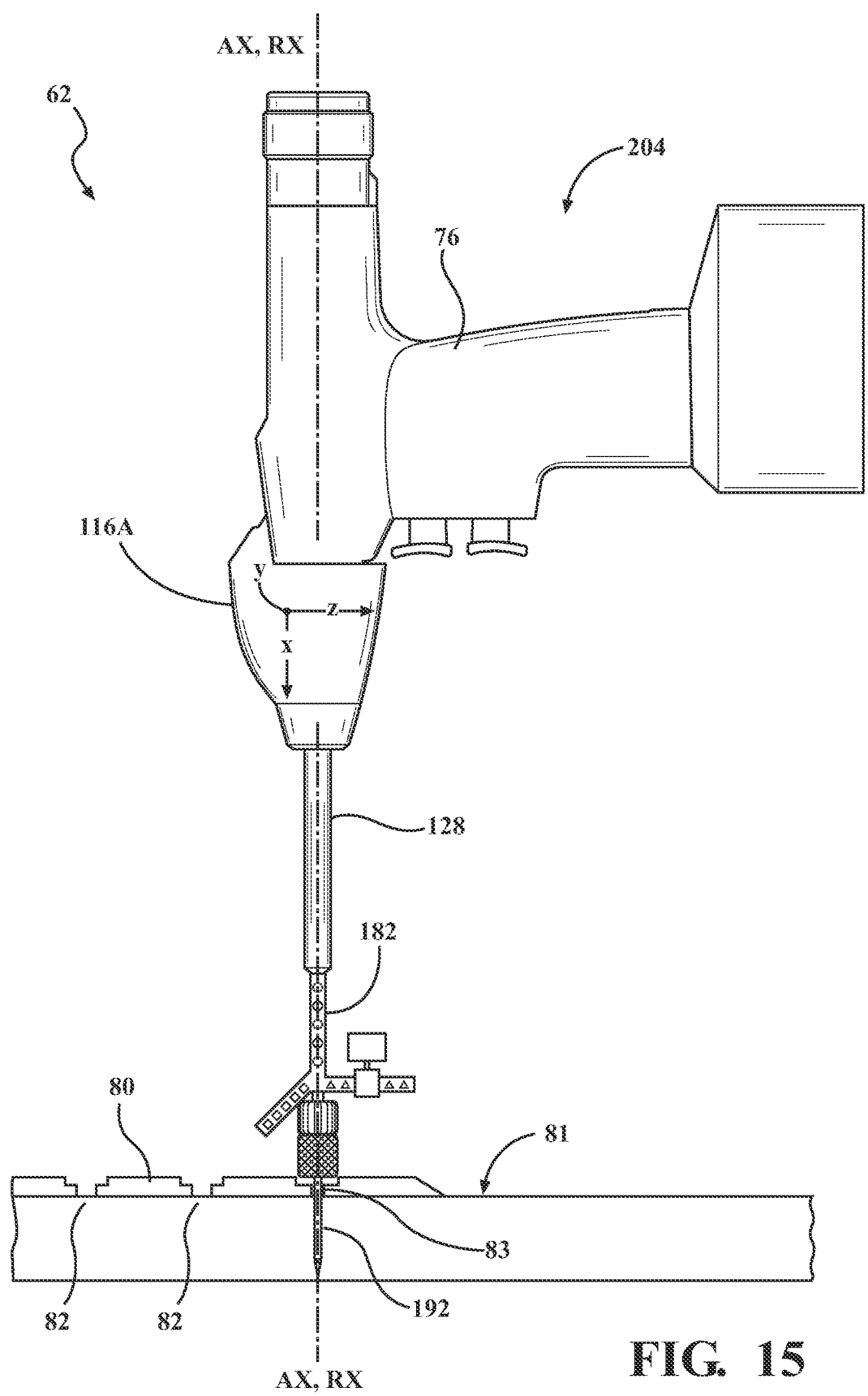
FIG. 15 is an elevation view of the surgical handpiece assembly in a reference orientation according to the teachings of the present disclosure.
Figure 16:
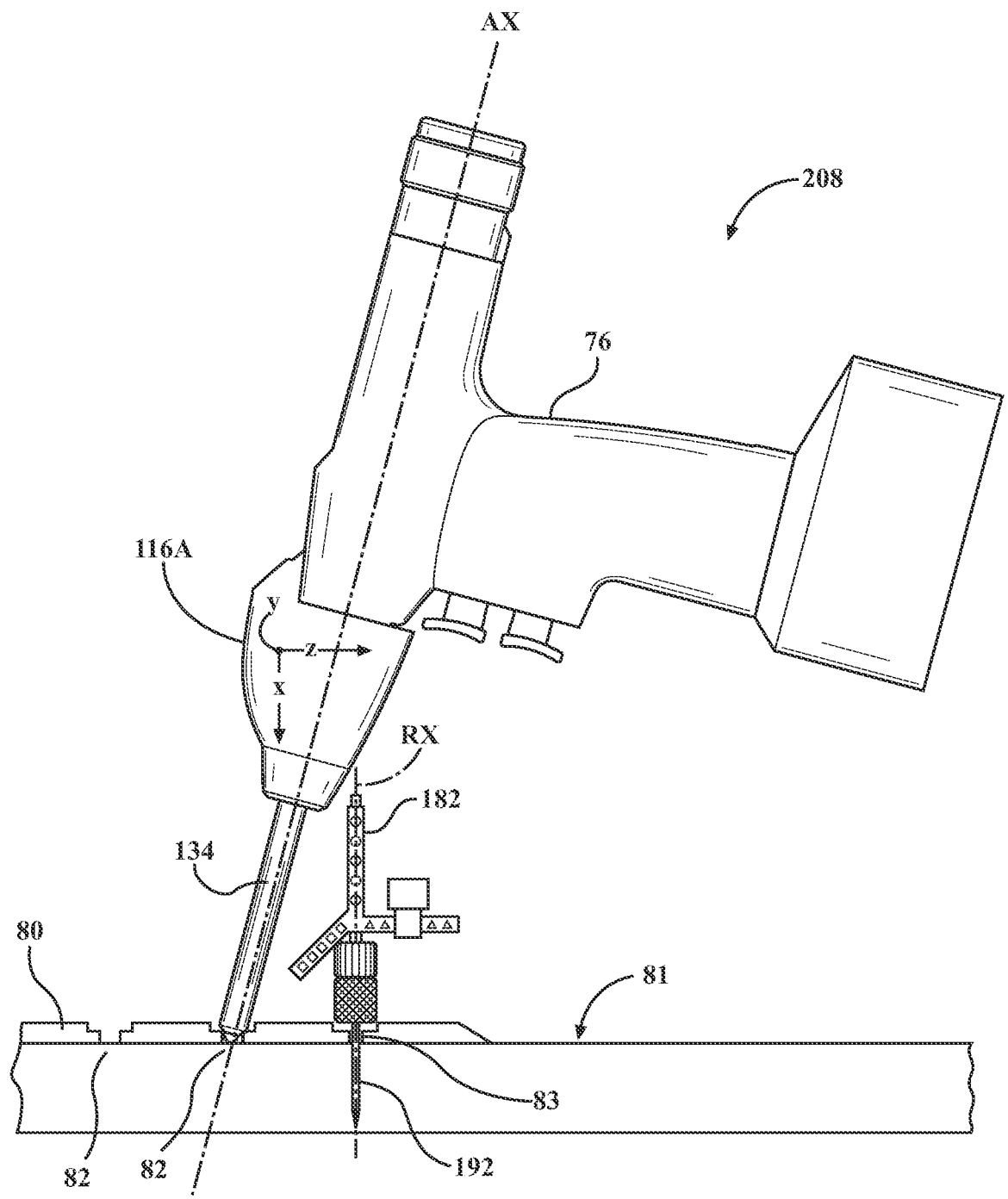
FIG. 16 is an elevation view of the surgical handpiece assembly in a drilling orientation according to the teachings of the present disclosure.

With reference to FIG. 15, the navigation computer 70 may register the handpiece coordinate system to the reference device coordinate system when a reference orientation 204 between the surgical handpiece assembly 76 and the reference device 182 is established. The surgical handpiece assembly 76 may be movable by the surgeon 79 between the reference orientation 204 and a drilling orientation 206 (as shown in FIG. 16).

To register the respective coordinate systems, the surgical handpiece assembly 76 may be coupled to the surface 194 of the reference device 182. In the illustrated example, the depth measurement extension 128 may be positioned such that it is coupled to the surface 194 (i.e., the peg or the cannula) of the reference device 182. The surgeon 79 may press the second button 148*b* on the attachment to zero the handpiece coordinate system with respect to the reference device coordinate system.

In an alternative configuration, the navigation computer 70 may detect the proximity of the surgical handpiece assembly 76 relative to the reference device 182 based on one or more sensors of the reference device 182 or the surgical handpiece assembly 76. Based on the detected proximity of the surgical handpiece assembly 76 relative to the reference device 182, the navigation computer 70 may automatically register the reference device coordinate system to the handpiece coordinate system. For example, the reference device 182 may include a magnet and the surgical handpiece assembly 76 may include a Hall effect sensor or, alternatively, the reference device 182 may include a Hall effect sensor and the surgical handpiece assembly 76 may include a magnet. In another example, the handpiece controller 162 may detect the magnetic field and register itself to the reference device coordinate system and then send a signal to the navigation computer 70 to begin integrating the orientation information after registration.

The handpiece orientation sensor 172 and the reference sensor 184 includes a gyroscope, and gyroscopes are subject to bias instabilities that cause the gyroscopes to drift over time. As such, the surgeon 79 may register the handpiece orientation sensor 172 with the reference device 182, periodically, during the surgical procedure in order to minimize tracking inaccuracies caused by gyroscope drift. This can be done by recoupling the end effector 108 to the surface 194 of the reference device 182 and zeroing the handpiece orientation sensor 172 by pressing the second button 148*b*.

In the reference orientation 204, the axis AX of the surgical handpiece assembly 76 is aligned with a reference axis RX defined by the reference device 182. In many configurations, the reference axis RX is perpendicular to one or both the bone 81 and the bone plate 80; however, the reference axis RX need not be perpendicular to the bone 81 or the bone plate 80. With reference to FIG. 16, the surgical handpiece assembly 76 is shown in the drilling orientation 206, the axis AX of the surgical handpiece assembly 76 is at an oblique angle relative to the reference axis RX. This oblique angle is the drilling angle that a screw may later be inserted into.

The navigation computer 70 may begin integrating the handpiece orientation signals after the navigation computer 70 registers the handpiece coordinate system relative to the reference device coordinate system. Alternatively, the integration function may be handled by another controller, such as the depth measurement attachment controller 144, the controller of the handpiece orientation sensor 172, the surgical handpiece controller 162, or any other suitable controller. For example, the navigation computer may begin integrating the handpiece orientation signals when the depth measurement extension 128 and the reference device 182 are brought into alignment and the surgeon presses the second button 148b. During registration, a coordinate transformation matrix between the handpiece coordinate system and the reference device coordinate system is determined. For example, the navigation computer 70 may be prompted to register the handpiece coordinate system to the reference device coordinate system when the surgeon 79 presses the second button 148b associated with zeroing the handpiece orientation sensor 172. In other examples, the navigation computer 70 may prompt the surgeon 79 to initiate the registration process. The navigation computer 70 may be configured to determine the orientation of the surgical handpiece assembly 76 by integrating the handpiece orientation signals over a duration of time. By integrating the handpiece orientation signals, the navigation computer 70 may then determine the change in orientation of the surgical handpiece assembly 76 from a reference orientation 204, as shown in FIG. 15 to the drilling orientation 206, as shown in FIG. 16, and thus the navigation computer 70 may determine the orientation of the surgical handpiece assembly 76.

As discussed previously, since the reference sensor 184 is affixed to the reference device 182 in a fixed manner and the reference device 182 has a fixed pose relative to the bone 81, the reference sensor 184 serves as a patient tracker. Each time an image is taken, a current value of the angular orientation of the reference sensor 184 may be recorded and associated with the particular image being taken. The navigation computer 70 may be configured to determine the orientation of the bone 81 by integrating the angular velocity values of the reference device orientation signals over a duration of time. By integrating the angular velocity values, the navigation computer 70 may then determine the change in orientation of the bone 81 during the surgical procedure.

Figure 17:
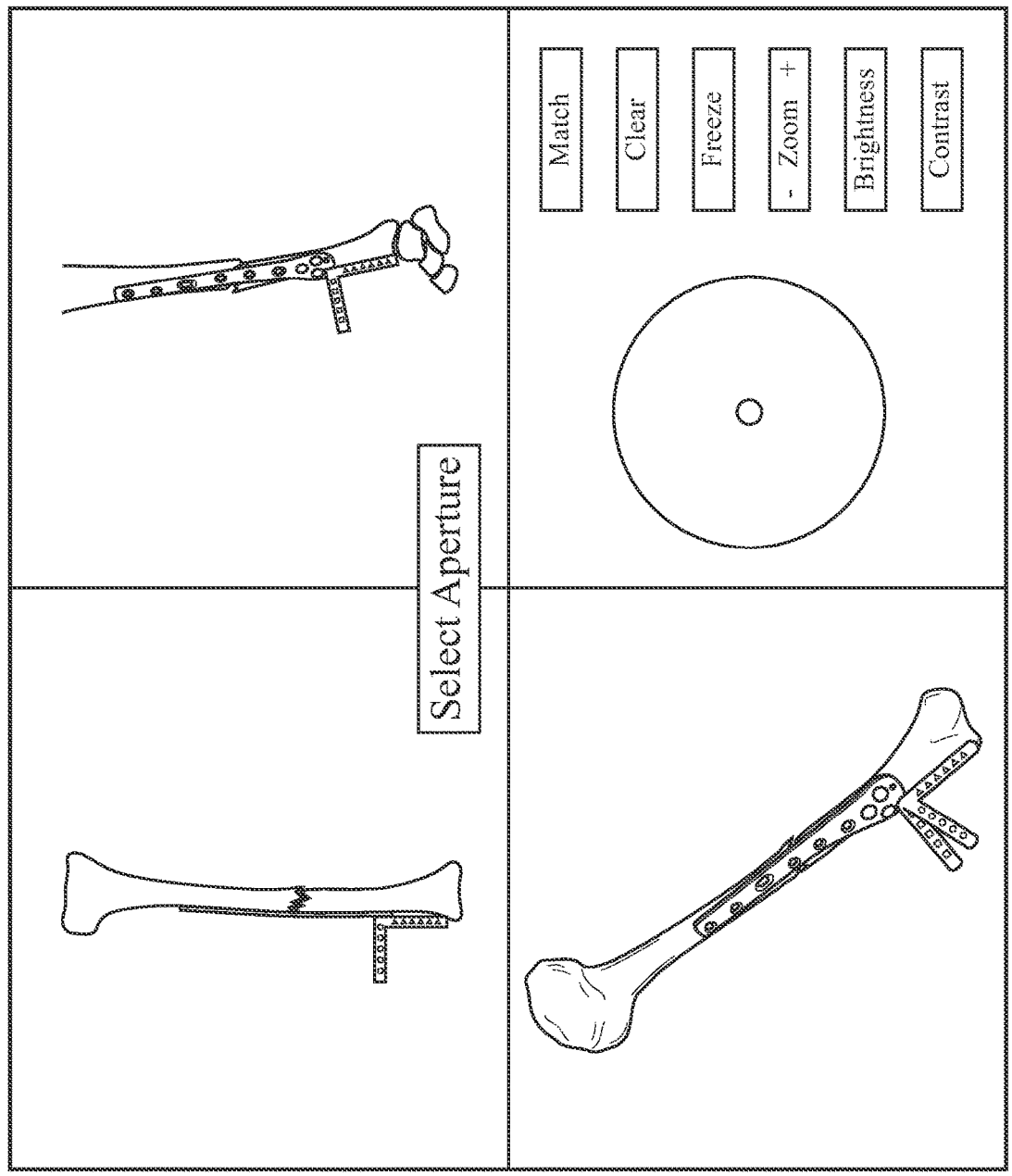
FIGS. 17-20 show a navigation display depicting virtual representations of a bone, a reference device, a bone plate, and a surgical handpiece assembly according to the teachings of the present disclosure.

With reference to FIG. 17, the navigation computer 70 displays the images and 3D models on the navigation displays 74. For example, one or more of a coronal view of a tibia, a sagittal view of the tibia, a traverse view of a tibia may be displayed. Since the system does not rely on conventional tracking means to track a position of the surgical handpiece assembly 76, an actual position of the surgical handpiece assembly 76 must be input by the surgeon 79. As such, the navigation computer 70 via the navigation displays 74 may be configured to prompt the surgeon 79 to indicate an actual position of the surgical handpiece assembly 76, more particularly, the tip of the end effector 108 with respect to the bone plate 80 and/or bone 81. For example, when the surgical system 10 includes the bone plate 80, the navigation computer 70 may prompt the surgeon 79 to make a first and second selection corresponding to a desired position of the tip of the end effector 108. The first selection may include a selection of a shadow of the aperture of the virtual bone plate that corresponds to the desired position of the end effector 108 in an xy-plane. The second selection may include a selection of the desired position in a plane that includes the z-axis. For example, for receiving the desired position of the end effector in an xy-plane, the navigation computer 70 may prompt the surgeon 79 to select a desired aperture on the images shown on the surgical navigation display 74 via a touch operation or via the input device 77.

In another example, the navigation computer 70 may prompt the surgeon 79 for a single user input regarding the desired position of the tip of the end effector 108 with respect to the 3D model. When the system does not include the bone plate 80, the navigation computer 70 may prompt the user to indicate or select an anatomical feature of the images corresponding to a current position of the surgical handpiece assembly 76. The navigation computer 70 may prompt the surgeon 79 to confirm the position of the surgical handpiece assembly 76 whenever the handpiece orientation sensor 172 is zeroed.

Figure 18:
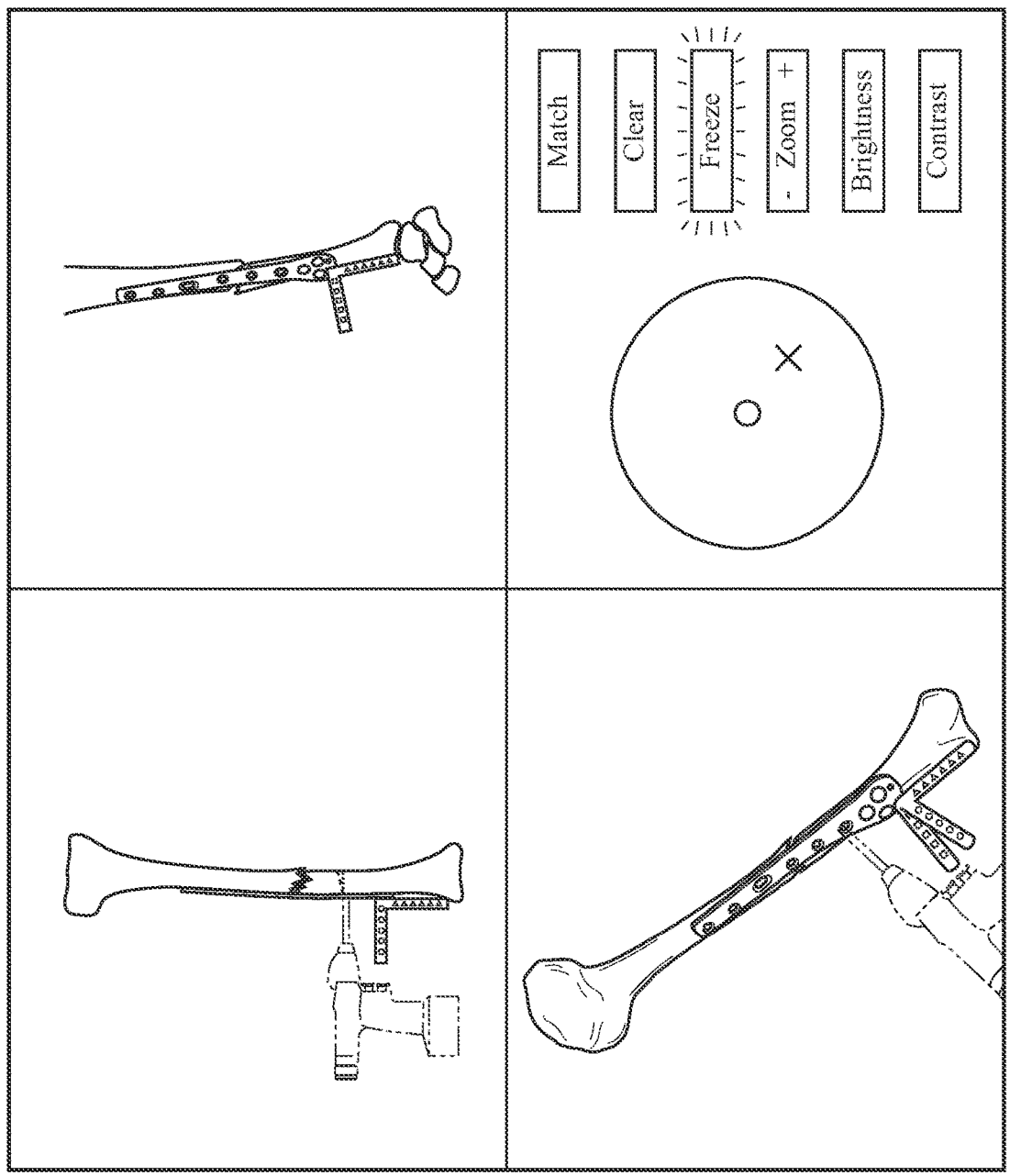
Figure 19:
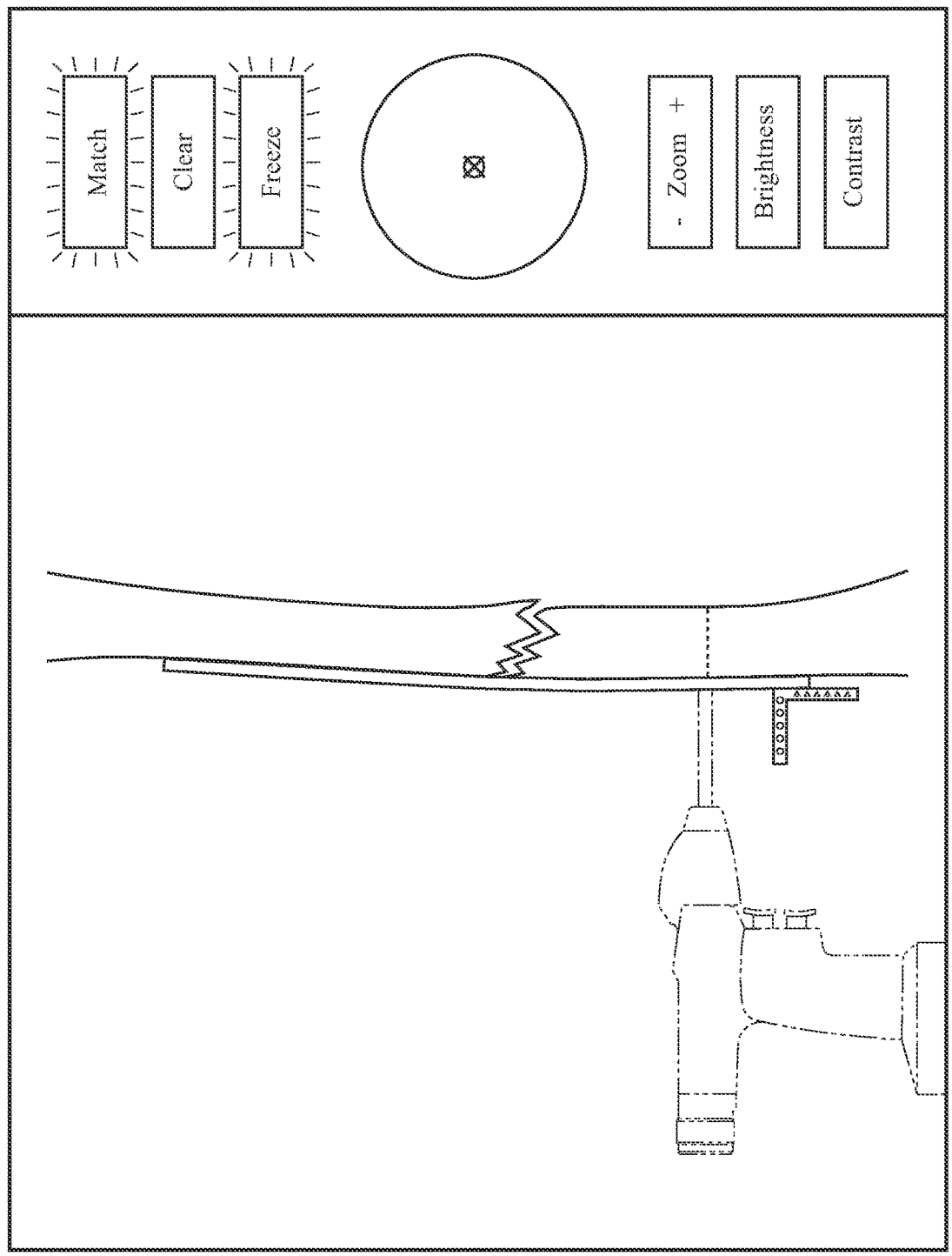

With reference to FIG. 18, the navigation computer 70 may superimpose a virtual representation based on the position input by the surgeon 79 and the determined orientation of the surgical handpiece assembly 76 over the images. The virtual representation may include a model of the surgical handpiece assembly 76, such as a model of the depth measurement attachment 116A and/or the end effector 108. The virtual representation may also include a virtual trajectory that projects into the bone 81. The surgeon 79 may then angulate the surgical handpiece assembly 76 until the surgeon 79 is satisfied with the virtual trajectory. For example, the model of the end effector 108 may be superimposed at the selected aperture in the case where the surgical system 10 includes the bone plate 80. In another example, such as when the surgical system 10 does not include the bone plate 80, a model of the tip of the depth measurement attachment 116A or end effector 108 may be superimposed at the selected anatomical feature in the images.

The navigation computer 70 may be configured to allow the surgeon 79 to freeze or store a trajectory as a desired trajectory when the surgeon 79 is satisfied with the virtual trajectory depicted in the images. When a desired trajectory is stored, the navigation display 74 may also include a graphical representation to provide a visual cue to the surgeon 79 when a current trajectory matches the stored desired trajectory. For example, a moving indication may be displayed on the navigation display 74 that moves along with the orientation of the surgical handpiece assembly 76. The moving indication may be shown on the navigation display 74 relative to a target (e.g., representation of crosshairs or a circle). The target is representative of the desired trajectory. Once the moving circle overlaps the target, the current trajectory matches the desired trajectory. Additionally, the visual information (e.g., a graphical representation) may be displayed on the display 156 of the surgical handpiece assembly 76 such that the surgeon is able to align the current trajectory to the stored desired trajectory without having to look at the navigation display 74.

The surgical navigation system 50 may be configured to generate an audible, visual, or tactile alert when the desired trajectory has been achieved. While this disclosure contemplates that the images and virtual representation is displayed on the navigation display 74, the navigation computer 70 may transmit the virtual representations to other computing device and/or displays including a display attached to the surgical handpiece assembly 76, a tablet, a laptop computer, or any other mobile devices.

Figure 20:
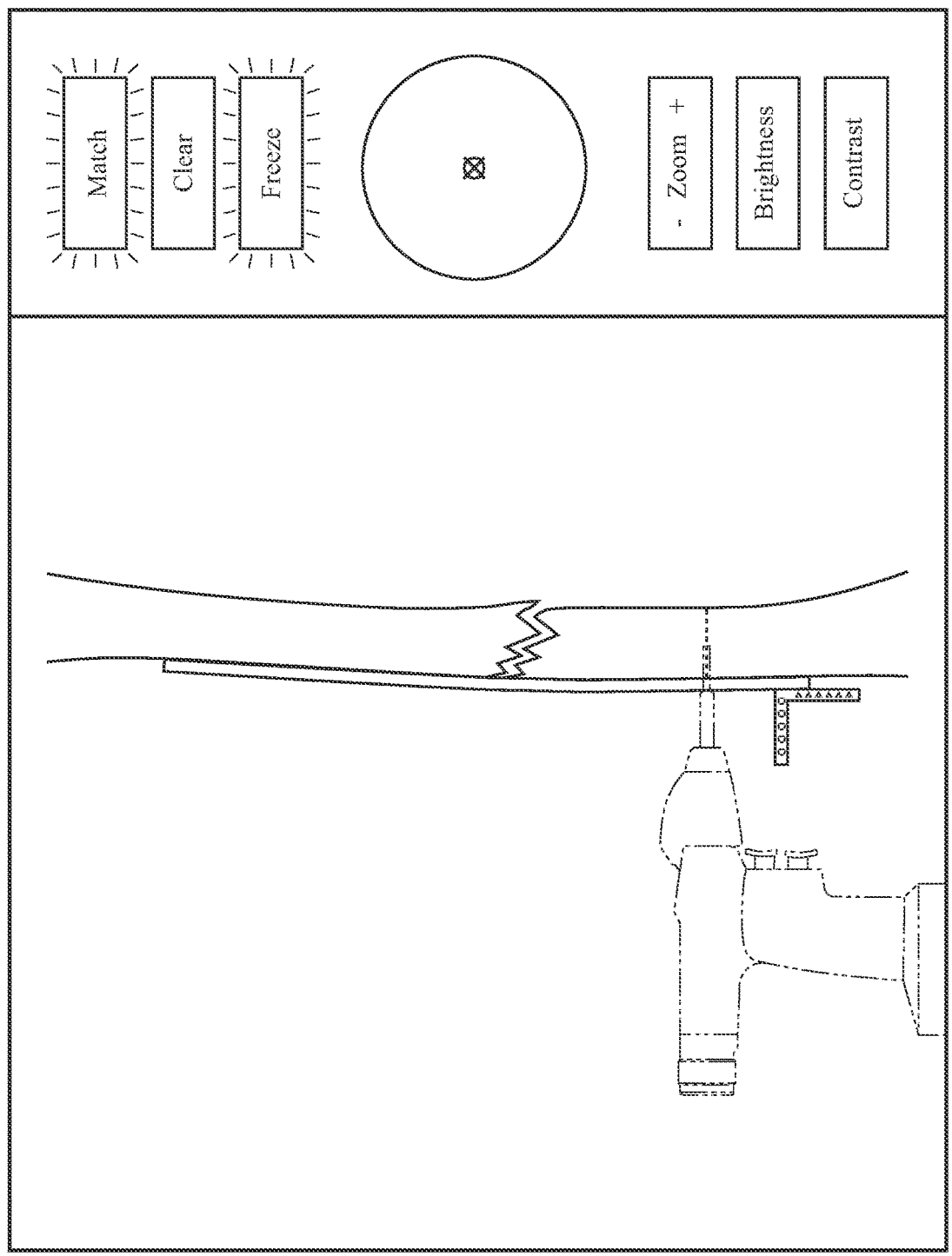

With reference to FIG. 20, as stated above, the displacement sensor 124 may be configured to generate a displacement signal to the surgical handpiece controller 162 which is then transmitted to the navigation computer 70. The displacement signal is responsive to displacement of the end effector 108 relative to the depth measurement extension 128 during or leading up to the drilling process. In some examples, the navigation computer 70 may be configured to depict a live depth depiction of the drilling procedure as the end effector 108 is drilled through the bone 81. As previously discussed, since the scaling/magnification factor may vary from one image to the next image, the navigation computer 70 may use the scaling/magnification factor for depicting the live depth depiction. For example, the navigation computer 70 may use the scaling/magnification factor when determining an appropriate pixel to millimeter conversion for each of the images.

In other examples, such as when a second attachment 116B is attached to the surgical instrument 104 (i.e., there is no depth measurement attachment 116A), the navigation computer 70 may be configured to stop displaying the virtual representation of the pose (i.e., position and orientation) of the surgical handpiece assembly 76 and associated virtual trajectory once drilling has begun.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the examples is described above as having certain features, any one or more of those features described with respect to any example of the disclosure can be implemented in and/or combined with features of any of the other examples, even if that combination is not explicitly described. In other words, the described examples are not mutually exclusive, and permutations of one or more examples with one another remain within the scope of this disclosure.

Spatial and functional relationships between elements (for example, between controllers, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "controller" may be replaced with the term "circuit." The term "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The controller(s) may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The controller may communicate with other controllers using the interface circuit(s). Although the controller may be depicted in the present disclosure as logically communicating directly with other controllers, in various configurations the controller may actually communicate via a communications system. The communications system includes physical and/or virtual networking equipment such as hubs, switches, routers, and gateways. In some configurations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various configurations, the functionality of the controller may be distributed among multiple controllers that are connected via the communications system. For example, multiple controllers may implement the same functionality distributed by a load balancing system. In a further example, the functionality of the controller may be split between a server (also known as remote, or cloud) controller and a client (or, user) controller.

Some or all hardware features of a controller may be defined using a language for hardware description, such as IEEE Standard 1364-2005 (commonly called "Verilog") and IEEE Standard 10182-2008 (commonly called "VHDL"). The hardware description language may be used to manufacture and/or program a hardware circuit. In some configurations, some or all features of a controller may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple controllers. The term group processor circuit encompasses a processor circuit that, in combination with additional processor circuits, executes some or all code from one or more controllers. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple controllers. The term group memory circuit encompasses a memory circuit that, in combination with additional memories, stores some or all code from one or more controllers.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SENSORLINK, and Python®.

What is claimed is:

1. A surgical system for operating on a bone of a patient, the surgical system comprising:
    a reference device defining at least one reference axis and including one or more radiopaque markers, the reference device configured to have a fixed pose relative to a surgical implant;
    a first sensor configured to have a fixed pose relative to the reference device when disposed on the reference device and configured to generate a first signal pertaining to orientation data of the reference device relative to a first coordinate system;
    a surgical instrument for coupling to an end effector;
    a second sensor configured to have a fixed pose relative to the surgical instrument and configured to generate a second signal pertaining to orientation data of at least one of end effector and the surgical instrument relative to a second coordinate system; and
    a navigation system configured to:
        receive (i) the first signal, (ii) the second signal, and (iii) an image of the reference device and the bone of the patient;
        display the image of the reference device and the bone of the patient;
        receive input signal related to a desired position of at least one of the end effector and the surgical instrument relative to the bone;
        register (i) the first coordinate system to the second coordinate system (ii) an orientation of the at least one reference axis relative to the bone in an image coordinate system, and (iii) a position of at least one of the end effector and the surgical instrument relative to the bone based on the input signal;
        determine an orientation of at least one of the end effector and the surgical instrument relative to bone based on the first signal and the second signal; and
        superimpose a virtual representation of at least one of the end effector and the surgical instrument over the image based on the registered position and the determined orientation of at least one of the end effector and the surgical instrument.

2. The surgical system of claim 1, wherein the second sensor is configured to be disposed on the surgical instrument.

3. The surgical system of claim 1, wherein:
    the image includes a shadow of the one or more radiopaque markers; and
    the navigation system is configured to register the orientation of the first sensor relative to the bone in the image coordinate system based on a pose of the shadow of the one or more radiopaque markers.

4. The surgical system of claim 1, further comprising the surgical implant, wherein the surgical implant is a bone plate that includes one or more apertures.

5. The surgical system of claim 4, further comprising a fixation member, wherein;
    the reference device includes a coupling portion; and
    a first portion of the fixation member is configured to affix the surgical implant to the bone and another portion of the fixation member is configured to be coupled to the coupling portion of the reference device.

6. The surgical system of claim 5, wherein:
    the image includes one or more shadows of the one or more apertures; and
    the input signal is a user input, the user input includes a first selection of the shadow of the one or more apertures corresponding to the desired position in an xy-plane and a second selection corresponding to the desired position in a plane that includes a z-axis.

7. The surgical system of claim 1, further comprising a first end effector and a second end effector, wherein:
    the end effector is further defined as a first end effector;
    when coupled to the first end effector, the surgical instrument is configured to perform a first function;

the surgical instrument is configured to be coupled to a second end effector in order to perform a second function; and the first function and the second function are different functions.

8. The surgical system of claim 1, wherein the first sensor and the second sensor are inertial measurement units.

9. The surgical system of claim 1, further comprising the end effector, wherein the reference device includes a surface that defines the at least one reference axis, and the surface is configured to receive the end effector.

10. The surgical system of any one of claim 9, wherein the surgical system is configured to automatically register the reference device coordinate system to the second coordinate system.

11. The surgical system of claim 9, wherein the surgical system is configured to detect a proximity of the surgical handpiece assembly relative to the reference device, and automatically register the reference device coordinate system to the second coordinate system based on the detected proximity.

12. The surgical system of claim 9, wherein the one or more radiopaque markers are disposed on the at least one reference axis.

13. The surgical system of claim 1, wherein the first sensor and the second sensors are gyroscopes.

14. The surgical system of claim 1, wherein:
the end effector is a drill bit;
further comprising a depth measurement attachment configured to be attached to the surgical instrument, the depth measurement attachment including a depth sensor configured to provide a third signal associated with a displacement of the end effector during a drilling process; and the navigation system is configured to receive the third signal and the virtual representation is further based on the third signal.

15. The surgical system of claim 14, further comprising a device configured to be attached to an imaging system, wherein:

the navigation system is configured to determine a scaling factor of the image based on at least one of the device and the one or more radiopaque markers of the at least one reference axis; and the navigation system is configured to receive the third signal and the virtual representation is further based on the scaling factor.

16. The surgical system of claim 1, further comprising a depth measurement attachment configured to be attached to the surgical instrument, the depth measurement attachment including a depth sensor configured to provide a third signal associated with a displacement of the end effector during a drilling process, wherein the reference device includes a post that defines the at least one reference axis and is configured to be inserted into the depth measurement attachment and wherein the second sensor is disposed within the depth measurement attachment.

* * * * *